US011196627B1

(12) United States Patent
Khoo et al.

(10) Patent No.: US 11,196,627 B1
(45) Date of Patent: Dec. 7, 2021

(54) MANAGED REMEDIATION OF NON-COMPLIANT RESOURCES

(71) Applicant: Amazon Technologies, Inc., Seattle, WA (US)

(72) Inventors: Boo Boon Khoo, Bellevue, WA (US); Lisa A. Winn, Seattle, WA (US); Archana Sridhar Mungara, Hillsboro, OR (US); Dennis Ono Tjandra, Seattle, WA (US); Thomas Smith, Rapid City, SD (US); Jamie Layne White, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/584,860

(22) Filed: Sep. 26, 2019

Related U.S. Application Data

(60) Provisional application No. 62/867,176, filed on Jun. 26, 2019.

(51) Int. Cl.
*H04L 12/24* (2006.01)
*H04L 29/06* (2006.01)

(52) U.S. Cl.
CPC ........ *H04L 41/0893* (2013.01); *H04L 63/102* (2013.01); *H04L 63/20* (2013.01)

(58) Field of Classification Search
CPC .... H04L 41/0893; H04L 63/102; H04L 63/20
See application file for complete search history.

(56) References Cited

U.S. PATENT DOCUMENTS

| | | | |
|---|---|---|---|
| 7,328,259 B2 | 2/2008 | Srinivasan et al. | |
| 7,627,891 B2 | 12/2009 | Williams et al. | |
| 7,996,373 B1 | 8/2011 | Zoppas et al. | |
| 8,041,786 B2 | 10/2011 | Tindal et al. | |
| 8,135,815 B2 | 3/2012 | Mayer | |
| 8,583,769 B1 | 11/2013 | Peters et al. | |
| 9,235,629 B1 | 1/2016 | Jones et al. | |
| 2002/0073237 A1* | 6/2002 | George | G06F 16/30 709/246 |
| 2003/0187998 A1* | 10/2003 | Petit | H04L 69/329 709/229 |
| 2005/0008001 A1* | 1/2005 | Williams | H04L 63/0218 370/352 |
| 2006/0101517 A1* | 5/2006 | Banzhof | G06F 21/577 726/25 |
| 2009/0205011 A1 | 8/2009 | Jain et al. | |
| 2009/0205012 A1 | 8/2009 | Jain et al. | |
| 2009/0271842 A1* | 10/2009 | Baumhof | G06F 21/6245 726/1 |

(Continued)

OTHER PUBLICATIONS

AWS Config, "Developer Guide", 2019, Amazon Web Services, Inc., pp. 1-238.

*Primary Examiner* — Ninos Donabed
*Assistant Examiner* — Raqiul A Choudhury
(74) *Attorney, Agent, or Firm* — Robert C. Kowert; Kowert, Hood, Munyon, Rankin & Goetzel, P.C.

(57) ABSTRACT

A configuration policy applicable to one or more target resources is determined. An indication of a non-compliance workflow corresponding to the policy, indicating an action, is obtained via a programmatic interface. In response to detecting that a particular target resource does not comply with the configuration policy, implementation of the action is initiated.

20 Claims, 13 Drawing Sheets

(56) References Cited

U.S. PATENT DOCUMENTS

| | | | | |
|---|---|---|---|---|
| 2015/0288718 A1* | 10/2015 | Pimenova | ............... | H04L 63/10 |
| | | | | 726/1 |
| 2016/0344609 A1* | 11/2016 | Shevenell | ............... | H04L 43/50 |
| 2017/0223033 A1* | 8/2017 | Wager | ................... | G06F 21/577 |
| 2017/0359388 A1* | 12/2017 | Finchelstein | ....... | G06F 16/1873 |
| 2020/0220902 A1* | 7/2020 | Schlotman, Jr. | .... | H04L 41/0813 |
| 2020/0329062 A1* | 10/2020 | Beauchesne | .......... | H04L 63/102 |

\* cited by examiner

Example configuration policy categories 310

- Security policies 312
- Availability/fault-resilience policies 314
- Data durability/replication policies 316
- Resource category restriction policies 318
- Tenancy policies 320
- Performance optimization policies 322
- Record-keeping policies 324
- Regulations-based policies 326
- Privacy protection policies 328
- Cost control policies 330
- Connectivity/isolation policies 332

Example remediation exception categories 410

Exempt target resource list 418

Resource tag-based exceptions 420

Per-target-resource action repetition exceptions 422

Resource group-level action repetition exceptions 424

Resource ownership-based exceptions 426

Example remediation workflow constraint categories 510

Cycle count constraints 518 (a workflow or action cannot be initiated/performed with respect to the same resource more than N times within a time period T)

Time window constraints 520 (e.g., workflows are to be initiated/performed only within specified hours of the day)

Resource group level workflow concurrency constraints 522 (e.g., with respect a group of G non-compliant resources, no more than W workflow instances are to be initiated/performed at a time)

Per-resource workflow concurrency constraints 524 (e.g., even if a resource is non-compliant with respect to R rules, no more than W workflow instances are to be initiated/performed at a time)

Interface 901

Enter rule info: 902

921 → Rule name:

922 → Rule description:

923 → Select from pre-defined rules    Upload custom rule

924 → Rule evaluation triggering conditions:

925 → Target resources:

Associate non-compliance remediation workflow with rule: 903

931 → Workflow name:

932 → Workflow description:

933 → Select from recommended workflows    Upload custom workflow

934 → Exceptions:

935 → Constraints:

MANAGED REMEDIATION OF NON-COMPLIANT RESOURCES

This application claims benefit of priority to U.S. Provisional Application No. 62/867,176 filed Jun. 26, 2019, titled "Managed Remediation Of Non-compliant Resources," which is hereby incorporated by reference in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that include network-accessible services that can be used by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users at a computing service by providing each user with one or more compute instances (e.g., guest virtual machines) hosted by the single physical computing machine. Each such compute instance may be regarded as a software simulation acting as a distinct logical computing system.

Some organizations may use numerous (e.g., tens of thousands) of virtualized and/or non-virtualized resources for their applications, spread across data centers of cloud infrastructure providers as well as premises outside the cloud provider networks. The mix of resources may change over time—e.g., some virtual machines may run only for a short period, others may run for longer periods, storage devices or databases may be dynamically configured as needed, and so on. Managing the configurations of large and dynamically changing collections of resources such that organizational requirements for application security, availability, and the like are satisfied may represent a non-trivial technical challenge.

BRIEF DESCRIPTION OF DRAWINGS

FIG. 3 illustrates example configuration policy categories for which non-compliance workflows may be configured, according to at least some embodiments.

FIG. 4 illustrates example categories of exceptions which may be associated with non-compliance remediation workflows, according to at least some embodiments.

FIG. 5 illustrates example categories of constraints which may be enforced at a configuration service with respect to non-compliance remediation workflows, according to at least some embodiments.

FIG. 9 illustrates an example interface which may be employed to associate a non-compliance remediation workflow with a configuration rule, according to at least some embodiments.

Figure 1:
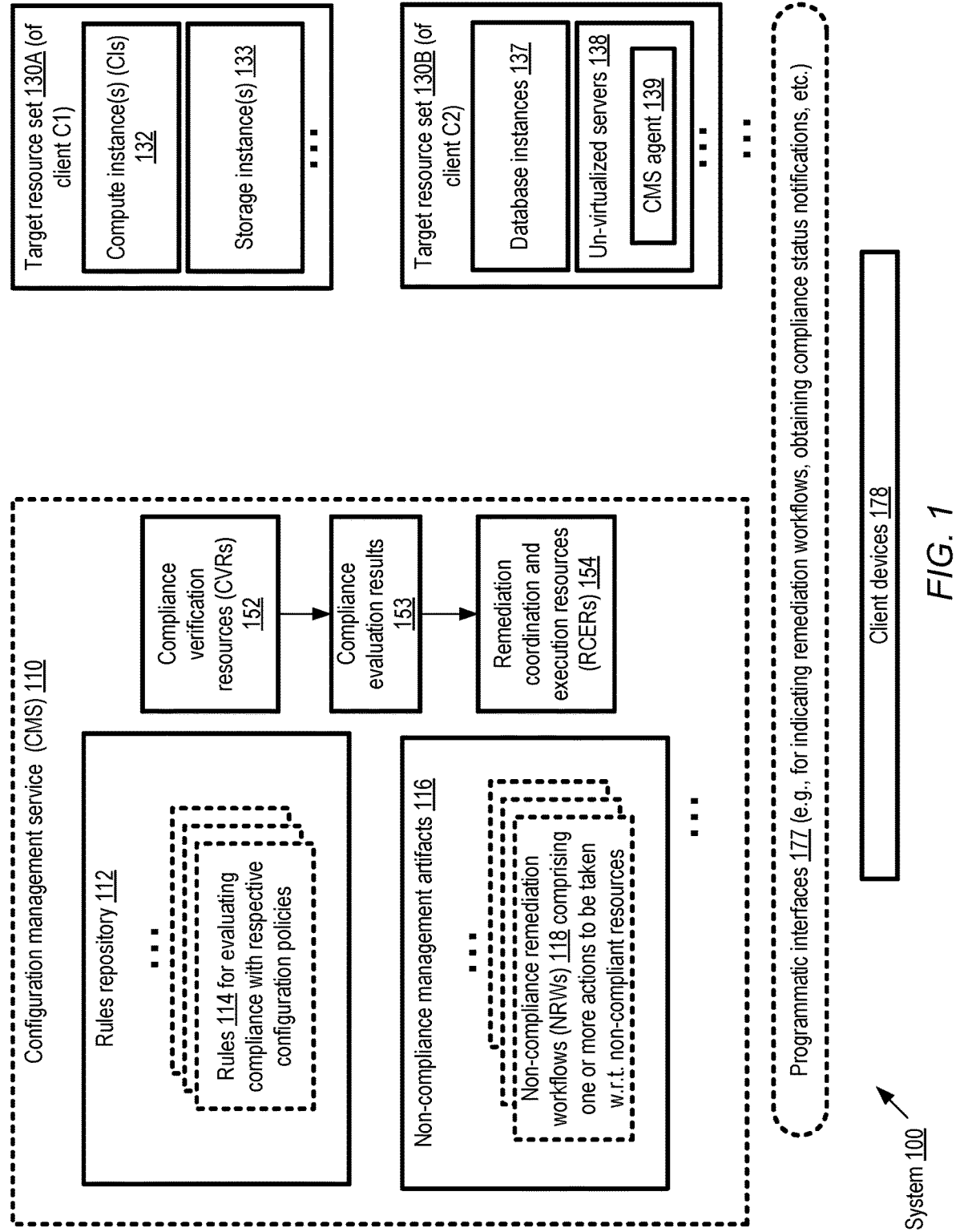
FIG. 1 illustrates an example system environment in which a configuration management service supporting customized policy non-compliance remediation workflows may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for scalable configuration and implementation of workflows comprising remediation actions undertaken in response to detecting non-compliance with respect to configuration polices associated with computing resources. Such techniques may be employed, for example, in some embodiments at a configuration management service (CMS) implemented within a provider network or cloud computing environment on behalf of clients for whom large numbers of resources, including virtualized or physical computing devices, storage objects, networking devices, databases, and the like may be configured. In at least some embodiments, the CMS may implement programmatic interfaces enabling clients to specify configuration rules for groups of the resources, or for individual resources, which indicate criteria and/or mechanisms or tools to be used to determine whether a given resource satisfies one or more configuration policies. Rules for detecting compliance or non-compliance with numerous types of policies may be indicated by clients to the CMS, (and stored and evaluated at the CMS), including for example security related policies, availability or durability related policies, performance optimization policies, and the like. The set of one or more resources to which a given rule is applied may be referred to as target resources of the rule in some embodiments. In various embodiments, a CMS client may programmatically associate one or more non-compliance remediation workflows with a given configuration rule, in effect indicating one or more actions that are to be performed at or initiated by the CMS in the event that a target resource of the rule is found to be non-compliant with the rule's configuration policy. A non-compliance remediation workflow (NRW) may include, for example, one or more automated actions to be initiated or performed in response to a detection of non-compliance. A wide variety of actions may be specified as part of an NRW in some embodiments, including for example changing of configuration settings of a target non-compliant resource, quarantining of a target non-compliant resource, initiating notifications, opening problem reports in a problem tracking system, and so on.

In at least some embodiments, metadata elements associated a given NRW may be used to control the implementation of the NRW actions. Such metadata may include, for example, one or more exception descriptors and/or one or more constraints. An exception descriptor may define or indicate scenarios in which one or more actions of the NRW are not to be performed with respect to a given resource, in various embodiments, despite the detection of non-compliance of the resource. In one simple example, one or more resources (e.g., resources R1 and R2) of a group of resources (which also includes resources R3-R100) for which a configuration rule CR1 and a corresponding NRW (NRW1) has been configured may be designated as "exempt" using an exception descriptor ED1 associated with NRW1, indicating that even if R1 or R2 are found to be non-compliant with respect to CR1, one or more actions of NRW1 are not to be performed. For other non-compliant resources R3-R100 of the group, for which an exception descriptor has not been provided or generated, the actions of NRW1 may be performed. Such exemptions may be used, for example, in a scenario in which the operations being performed at R1 and R2 are mission critical or important enough to a client that the client wishes to ensure that policy non-compliance is handled by experienced administrators or experts, instead of allowing the CMS to handle the non-compliance. Other types of exceptions may also be specified programmatically in various embodiments, e.g., by a client on whose behalf CR1 and NRW1 are employed. In addition to exceptions, more general constraints on the execution of NRW actions may also be specified and enforced in some embodiments—e.g., a time window constraint may indicate that a given NRW or NRW action is only to be initiated within a specified range of off-peak resource usage hours, and so on.

In various embodiments, a system may comprise one or more computing devices. The computing devices may include instructions that when executed at or across one or more processors cause the computing devices to implement one or more subcomponents of the CMS, e.g., including subcomponents responsible for storing configuration rules indicating criteria to be used to evaluate violations of configuration policies at target resources, detecting such configuration policy violations at the target resources, and taking responsive actions. In response to a detection, at a subcomponent of the CMS, that a particular target resource of a configuration rule does not satisfy at least one criterion for compliance with a configuration policy, the CMS may determine whether an NRW has been associated with the rule in various embodiments. If one or more NRWs have been associated with the rule, the CMS may initiate one or more operations associated with each of the NRWs. For example, if an NRW has exception descriptors associated within it, the CMS may make a determination as whether the target resource represents an example of an exception indicated in the descriptors in various embodiments. If the target resource is not covered by an exception, the CMS may check whether the implementation of the NRW would violate any constraints applicable to the NRW. If the target resource is not an exception example, and if no applicable constraints would be violated, in various embodiments the CMS may initiate implementation of one or more of the NRW's automated actions in at least some embodiments. In some embodiments, the CMS may also provide indications of the completion status of the workflows and/or the compliance status (which may change in some cases as a result of the NRW) of the target resource with respect to the policy or rule, e.g., via programmatic interfaces accessible to CMS clients, or using other notification or messaging mechanisms.

In one embodiment, a client may specify a program to be run to implement an action of an NRW, and a computing service of the provider network at which the program should be run. Implementation of such an action may involve a submission by the CMS of a request indicating the program to the computing service, such as an event-driven "serverless" computing service which implements the equivalent of a functional programming model. In contrast to some computing services at which computing resources may be assigned or allocated to clients in advance, at such an event-driven computing service, resources may not be pre-provisioned for clients. Instead, when a client submits a program for execution, this may trigger the dynamic selection of a resource for executing the program, and the results of the execution of the program may be provided to a destination indicated by the client (such as another program for implementing another action of the NRW). In at least one embodiment, a client may simply provide, via the programmatic interfaces of the CMS, a communication endpoint to which a request to execute an NRW action may be sent when needed from the CMS.

In some embodiments, exceptions and/or constraints may be defined and implemented at any of several granularities—e.g., some exceptions and/or constraints may apply to an NRW as a whole, while other exceptions or constraints may apply to an individual NRW action. In at least some embodiments, the CMS may provide, with respect to a given resource, a set of recommended configuration policies (including criteria to be used to evaluate compliance/non-compliance), rules and/or NRWs, and a client may choose from among such pre-defined polices, rules or NRWs. In an embodiment in which the CMS indicates a recommended NRW to a client, the set of permissions/credentials needed to perform the NRW actions may also be provided, enabling the client to pass on the needed permissions/credentials to the CMS for use if the client approves the recommended NRW and the NRW is actually implemented. In one embodiment, the CMS may provide metrics pertaining to policy non-compliance—e.g., the number of instances of non-compliance that were identified at a client's resources, the number of times that an NRW was executed, and so on. In at least some embodiments, the CMS may provide, via one or more visualization tools or other programmatic interfaces, results of analytic algorithms (e.g., multi-dimensional classification algorithms) applied to such metrics. Such analytics results may include, for example, a temporal, geographical or account-based distribution analysis of one or more NRWs. The temporal distribution analysis may indicate at what times, for example, various NRWs were initiated during a given time period, when the NRWs or their actions completed, and so on. In scenarios in which the target resources are distributed among various data centers in different cities, states or countries, the geographical distribution analysis may indicate, for example, whether NRW executions were spread unevenly among different locations, which may in turn potentially point to the need for systemic changes at some locations to reduce non-compliance. Account-based distribution analysis may indicate, for example, whether configurations set up by or on behalf of one user or client account were found non-compliant more often than the configurations set up on behalf of other users or clients. In at least some embodiments, the CMS may utilize one or more machine learning models, trained using large data sets of NRW execution metrics records, to identify configuration process improvements or other best practices that can be used to reduce non-compliance, and provide an indication of such process improvements or best practices to clients. Note that in some embodiments, an NRW may include one or more on-demand remediation actions. For a given on-demand action, a notification may be supplied to a client regarding a non-compliance that was detected and the associated on-demand action, and the on-demand action may be initiated when a request or approval for the action is received in some embodiments.

As one skilled in the art will appreciate in light of this disclosure, certain embodiments may be capable of achieving various advantages and practical applications/benefits, including some or all of the following: (a) enhancing application security by automating at least some security-related tasks and/or isolating/terminating resources that have been found to be non-compliant with security policies, (b) reducing the amount of computing resources wasted as a result of incomplete, incorrect or sub-optimal configuration, and (c) enhancing the user experience of administrators responsible for managing large fleet of resources by providing easy-to-understand information and/or recommendations pertaining to policy non-compliance.

Example System Environment

FIG. 1 illustrates an example system environment in which a configuration management service supporting customized policy non-compliance remediation workflows may be implemented, according to at least some embodiments. As shown, system 100 comprises artifacts and resources of a configuration management service 110 which may be used to automate various tasks associated with the administration of one or more target resource sets such as resource set 130A and resource set 130B. In at least some embodiments, the CMS 110 may comprise a rules repository 112 and a set of con-compliance management artifacts 116. Configuration rules 114 stored in the repository 112 may indicate criteria, programs, tools or other mechanisms to be used to evaluate compliance with respective configuration policies applicable to target resources, such as policies for enforcing security requirements, availability requirements and the like. Compliance verification resources (CVRs) 152 of the CMS, which may comprise some combination of hardware and software at one or more computing devices, may be responsible for checking, e.g. in accordance with triggering conditions/schedules defined for the rules 114, whether target resources of resource sets 130 comply with applicable configuration policies, or whether the target resources are non-compliant with the policies.

In the depicted embodiment, the CMS may implement one or more sets of programmatic interfaces 177, such as web-based consoles, graphical user interfaces, command-line tools, application programming interfaces (APIs), which can be used by CMS clients to submit a variety of requests, e.g., from client devices 178 such as laptops, desktops, mobile computing devices and the like, and receive corresponding responses. For example, such interfaces 177 may be employed by clients to submit rules 114, associate rules with target resources, query or view the compliance status of target resources with respect to various rules/policies, and so on.

In at least some embodiments, the CMS may obtain, e.g., via the programmatic interfaces 177 or via some other mechanism, an indication of a non-compliance remediation workflow (NRW) to be associated with a given rule 114. The NRW may include one or more automated actions to be executed when non-compliance with the rule's policy is detected with respect to one or more resources in the depicted embodiment. In at least some embodiments, one or more exception descriptors and/or constraints with respect to the NRW may also be obtained and/or generated at the CMS 110, and stored, along with the NRW in a collection of artifacts 116 referred to as non-compliance management artifacts. Exception descriptors may for example indicate scenarios or conditions under which a particular action or NRW is not to be executed, while constraints may indicate various types of limits which are not to be violated when executing NRW actions. Any of a wide variety of formats, markup languages and/or or programming languages may be used to indicate configuration rules, NRW actions, exceptions and/or constraints in different implementations. For example, any combination of JSON (JavaScript Object Notation), YAML (YAML Ain't Markup Language), XML (Extended Markup Language), Python, Java, Perl, and/or a proprietary configuration management language supported at the CMS may be used in different implementations. In one embodiment the non-compliance management artifacts may be stored within the rules repository 112. One or more rules, NRWs, exceptions and/or constraints need not necessarily be specified by clients in one embodiment—instead, control plane components of the CMS 110 may automatically generate such rules, NRWs, exceptions, and/or constraints based on a knowledge base developed over time, best practices policies of the CMS itself, results obtained from machine learning models, and so on.

The CMS 112 may comprise a set of remediation coordination and execution resources (RCERs) 154, comprising some combination of software and hardware resources at one or more computing devices in the depicted embodiment. The RCERs may be granted access to a database or repository of compliance evaluation results 153 generated by the CVRs 152 in at least some embodiments; in other embodiments, at least a subset of the results 153 may be transmitted to the RCERs from CVRs without necessarily being stored in a persistent repository as such.

In response to a detection or determination, e.g., by compliance verification resources 152 based on results obtained at CVRs, that a given target resource of one of the target resource sets 130 to which a rule 114 applies does not satisfy a policy compliance criterion of the rule, one or more operations may be initiated at the RCERs 154 in the depicted embodiment. For example, an RCER may determine whether an NRW has been defined or associated with respect to the rule 114 or the configuration policy which has been violated, and further determine whether an exception descriptor of the NRW applies to the non-compliant target resource. If the non-compliant target resource does not represent an exception, in at least some embodiments an RCER 154 may determine whether implementing an action of the NRW would violate a constraint associated with the NRW. If constraint violation would not result from the execution of the action, the action may be initiated by an RCER 154 in various embodiments. Similar checks regarding exceptions and/or potential constraint violations may be performed with respect to each action of the NRW in some embodiments. Indications of the status of the NRW or individual actions of the NRW may be provided via programmatic interfaces 177 in some embodiments, e.g., via automatically generated notifications, in response to queries submitted by clients, or as part of an automatically-updated status interface. Metrics pertaining to the execution of NRWs, exceptions identified at the RCERs, constraints checked at the RCERs, and the line may be provided in some embodiments as well. In at least one embodiments, results of analytics algorithms and/or machine learning models whose input data sets include records of NRW executions may also or instead be provider programmatically to clients. In at least some embodiments, control plane components of the CMS may monitor the usage levels of the RCERs 154, and provision additional RCERs as the workload levels associated with remediation workflow executions increase.

In at least one embodiment, one or more RCERs may be used in a multi-tenant manner, e.g., for performing remediation workflow actions on behalf of multiple clients of the CMS concurrently, thus reducing the total number of RCERs that have to be provisioned to remediate policy violations for a large number of clients and target resources. In one embodiment, a CMS client may submit a request for remediation operations associated with a given set of target resources or rules to be performed in a single-tenant mode; in response, the CMS may set aside one or more RCERs for single-tenant use on behalf of the client, and utilize such RCERs exclusively for the client when non-compliance is detected at the client's target resources. In various embodiments, the CMS may allow clients to simply specify or select the NRWs needed to remediate non-compliance, without having to be concerned with the details of provisioning resources to implement the remediation operations.

A wide variety of resources may be managed with the help of configuration rules and NRWs in the depicted embodiment. For example, target resource set 130A of a client C1 of the CMS may include compute instances (CIs) 132 such as virtual machines set up at a virtualized computing service, as well as storage instances 133 (e.g., volumes, file systems, unstructured data objects, etc.) set up at one or more network-accessible storage services. Target resource set 130B of another CMS client C2 may include, for example, one or more database instances 137 and un-virtualized servers 138. In some embodiments, a CMS agent 139 (e.g., comprising one or more programs or software processes) may be instantiated at one or more target resources, although such agents may not be required at other target resources. Such agents may not be needed, for example, when remediation action operations can be initiated remotely (i.e., from a CMS resource); in contrast, if a remediation action has to be run as an operating system process of a target resource, or within such an operating system, an agent may be set up in some embodiments. Note that with respect to some target resource types, a resource may not have to be in existence for an applicable rule or NRW to be configured for it—for example, some rules and NRWs may be defined for any compute instance set up (currently or in the future) on behalf of a given client, so that the rule and/or NRW may be applied to a compute instance that is launched or initialized after the rule/NRW was set up.

Non-Compliance Remediation Workflow Metadata

Figure 2:
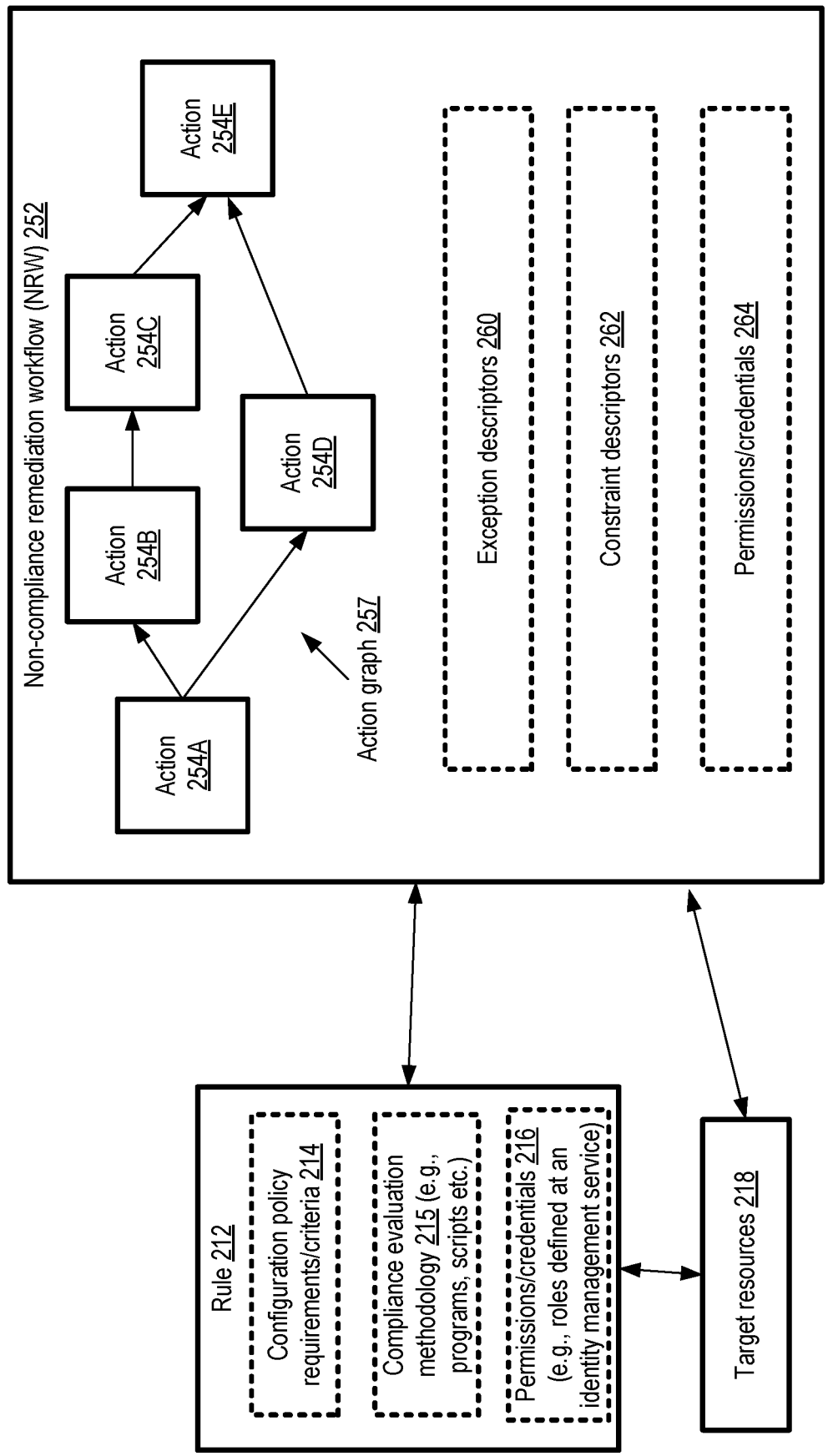
FIG. 2 illustrates example elements of non-compliance workflow metadata which may be stored at a configuration management service, according to at least some embodiments.

FIG. 2 illustrates example elements of non-compliance workflow metadata which may be stored at a configuration management service, according to at least some embodiments. In the depicted embodiment, non-compliance remediation workflow 252 may be associated with a configuration rule 212, e.g., at a configuration management service similar to CMS 110 of FIG. 1. The rule 212 may indicate a set of requirements or criteria 214 with respect to one or more configuration policies to be enforced with respect to one or more target resources 218. In some embodiments, a compliance evaluation methodology 215 may be specified for the rule 212, e.g. by client in whose behalf the rule is to be applied, indicating one or more programs, scripts etc. that are to be run to determine compliance or lack of compliance with the policy or policies. In one such embodiment, a client may also indicate permissions/credentials 216 that are to be used to evaluate compliance. In some embodiments, a role or capability defined at an identity or authorization management service or tool may be indicated by a client, and the role or capability may be granted to the CMS for the purpose of executing the compliance evaluation methodology.

NRW 252 may include an action graph 257 in the depicted embodiment, such as a directed acyclic graph (DAG) whose nodes represent respective actions 254 (e.g., actions 254A-254E) to be taken when non-compliance with respect to rule 212's configuration policy requirements or criteria is detected with respect to a target resource 218. The edges of the graph 257 may indicate, for example, that some actions 254 are to be taken in sequence—e.g., action 254B is to be initiated after action 254A, action 254 C is to be initiated after action 254B, and so on. In some cases, the graph may indicate that a plurality of actions may be executed in parallel—e.g., at least a portion of actions 254B and 254D may be executed concurrently. In some embodiments, when specifying the action graph, a workflow source may indicate that a given action (e.g., 254B) as to complete successfully before a successor action (e.g., 254C) can be initiated, while in other embodiments a best-effort approach may be used, in which at least some successor actions may be initiated even if a prior action has not finished or has failed.

In addition to the action graph, an NRW may have one or more associated metadata elements in some embodiments, such as exception descriptors 260, constraint descriptors 262, and permission/credentials 264. Exception descriptors 260 may be used to indicate scenarios in which, despite detected non-compliance, one or more actions of the graph 257 are not to be implemented with respect to a given resource or set of resources. As suggested by the use of the word "exception", exception descriptors may be intended to enable CMS clients or NRW designers to cover infrequently-encountered situations in which the usually-implemented actions are not to be performed in the depicted embodiment. For example, among a group of 10,000 compute instances of a client to which a rule 212 is applicable, a few may be considered mission-critical, such that any configuration changes to the mission-critical compute instances have to be performed manually by an administrator (instead of automatically by the CMS). In such an example scenario, exception descriptors identifying the mission-critical compute instances as exempt from the NRW may be stored.

Constraint descriptors 262 may be used to indicate restrictions, limits or boundaries with respect to the execution of the actions 254 in some embodiments—e.g., the maximum number of times within a given time interval a given action 254 can be performed with respect to a given target resource 218, or time windows within which actions 254 are not to be performed. A concurrency constraint submitted with respect to the 10,000 compute instance example mentioned above may indicate, for example, that if the same non-compliance is detected at all 10,000 instances (as may happen when the same configuration tools/scripts are used for all the compute instances), corresponding NRWs are to be started at no more than 1000 of the compute instances at a time. Note that in some embodiments, a given restriction on the execution of a NRW may be expressed either as an exception, or as a constraint, depending on the scope of the restriction; that is, some types of guidance with respect to execution of NRWs may be provided using either mechanism.

In at least some embodiments, a client may provide authorization/authentication information, such as permissions/credentials 264 which may be required to implement the actions 254, to the CMS. In some embodiments, as in the case of the permissions/credentials associated with rule evaluation, a role (e.g., a "compute instance administrator" role) or capability defined at an identity or authorization management service or tool may be indicated by a client, and the role or capability may be granted to the CMS for the purpose of executing the NRW actions 254. In some cases, respective permissions/credentials/roles etc. may be used for individual ones of the actions 254—that is, not all the actions may require the same permissions. At least in some example scenarios, the authorization/authentication information required to evaluate whether a target resource violates a configuration policy may differ from the authorization/authentication information required to implement an NRW corresponding to the policy. For example, to determine whether a given resource belongs to a security domain defined for a client may require one set of credentials, while to take an NRW action such as quarantining or disconnecting the resource from the network may require a different set of credentials. In at least one embodiment, the CMS may attempt to verify, when an NRW is set up on behalf of a client, whether the permissions/credentials 264 provided by the client are sufficient to perform the NRW actions, and inform the client if the permissions/credentials are insufficient. In other embodiments, such attempts to confirm that the permissions/credentials are sufficient may not be performed in advance, and if an NRW action fails because of a lack of a required permission, the client may be informed after the failure.

Example Configuration Policy Categories

A wide variety of requirements or policies regarding resource configuration and usage may be enforced in various embodiments, using rules and associated workflows of a configuration management service (CMS) similar to CMS 110 of FIG. 1. FIG. 3 illustrates example configuration policy categories for which non-compliance workflows may be configured, according to at least some embodiments.

Security policies 312 may, for example, indicate values for configuration settings which restrict the sources from which network traffic is permitted to a given target resource, the destinations to which traffic from a given target resource may flow, the sources from which software downloads are permitted at a given target resource, the entities (e.g., users, groups etc.) to whom administrative privileges are granted to a given target resource, and so on. In some embodiments, security policies may indicate the types of permitted storage devices that can be configured for a given resource (because different types of storage devices may have respective security profiles)—e.g., whether a compute instance can use remote persistent storage devices only, whether only local persistent storage is permitted, etc.

Availability and fault-resilience related policies 314 may, for example, be used to ensure that a given application or service being implemented using target resources can continue operations in the event of at least some failures. In one embodiment, a provider network at which target resources of configuration rules are provisioned may be organized into a plurality of geographical regions, and each region may include one or more availability containers, which may also be termed "availability zones". An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. Various types of services and/or applications may therefore be protected from failures at a single location by launching multiple application instances in respective availability containers, or distributing the nodes of the application or service across multiple availability containers, and availability/fault resilience policies 314 may be enforced using configuration rules for such applications/services. In one example scenario involving an availability related policy, if a target resource at which a primary node of some application runs does not indicate (e.g., via a configuration setting) that a secondary node of the same application has been started at some other target resource, non-compliance with respect to the availability related policy may be detected.

Similarly, in at least some embodiments, data durability/replication policies 316 may be enforced using rules and NRWs to ensure that data objects created or stored at a given target resource are replicated at some number of persistent storage devices, e.g., at a secondary storage device at some other target resource. In some embodiments, availability and or durability related policies may be expressed by indicating a particular service that is to be used for an application or data set—e.g., if the file systems of a compute instance are not set up using a provider network storage service that provided built in replication, the compute instance may be designated as non-compliant with a data durability policy.

In some embodiments, the resources offered to clients at a virtualized computing service or storage service may be categorized into a plurality of classes, with different performance characteristics, billing rates, and so on. For example, a virtualized computing service may allow clients to request "small", "medium" or "large" compute instances, and provide information to the clients indicating the differences between the different classes of compute instances.

Resource category restriction policies 318 may indicate, with respect to a particular user, group or application set, the categories of resources that can be set up on behalf of the user, group or application set in the depicted embodiment. If a user is only to be allowed to access "medium" compute instances per a category restriction policy 318, for example, and has somehow obtained access to a "large" compute instance, this would constitute non-compliance.

Some virtualized computing services may allow virtual machines, applications or programs to be run concurrently on behalf of different clients at a given physical resource. Such scenarios may be referred to as a multi-tenant mode of operation of the service; in contrast, in a single-tenant mode, a physical resource may only be utilized on behalf of a single client. In at least some embodiments, one or more tenancy policies 320 may be enforced at a CMS—e.g., a client may wish to run some applications at target resources in a single-tenant mode, and other applications in a multi-tenant mode.

Performance optimization policies 322 may be used to ensure that values for one or more configuration settings in use at various target resource have been selected so as to obtain a desired level of performance. For example, for compliance with such a policy, block size configuration settings for input/output (I/O) operations may have to be set for improved sequential or random I/O, depending on an application's I/O usage pattern, or caching may have to be enabled at one or more layers of a storage software/hardware stack.

For at least some types of applications, the application owners may wish to retain log records at various levels of the hardware/software stack being used, and record-keeping policies 324 may be used to ensure that logging is enabled appropriately. In some countries, states, or cities, various computing related regulations applicable in the corresponding jurisdiction may be in effect—e.g., notifications may have to be provided to end users of some applications regarding how/where their data is being stored or transferred. Regulations-based policies 326 (which may in some cases include record-keeping policies 324 and/or privacy protection policies 328) may therefore have to be enforced in such environments in various embodiments. Privacy protection policies 328 (e.g., governing the collection, access, use and distribution of data pertaining to various users) may be specified by some CMS clients for various types of data.

Cost control policies 330 may be submitted with respect to target resources in some embodiments, and enforced using configuration rules and workflows. Such cost control policies may, for example, involve ensuring that the billing costs to be incurred by a given client or organization due to the use of target resources of a service do not exceed a threshold. A cost control policy may be violated, for example, if a resource were to be requested by a member of an organization such that the billing cost to the organization resulting from the allocation or use of the resource (in addition to other previously-allocated resources) would exceed such a threshold.

Connectivity or isolation policies 332 may pertain to networking configuration settings—e.g., a client of a CMS may wish to ensure that a set of compute instances is not granted direct access to the public Internet, and such a requirement may be enforced using a corresponding configuration rule and non-compliance workflow. In one embodiment, respective isolated virtual networks (IVNs) may be established on behalf of various clients of a virtualized computing service whose resources are being managed using a CMS. An isolated virtual network may comprise a collection of networked resources (including, for example, compute instances) allocated to a given client, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. Some connectivity/isolation policies 332 may indicate that some target resources (e.g., responsible for one type of application functionality) have to be configured within one IVN, while other target resource (e.g., responsible for one type of application functionality) are to be configured in a separate IVN in one embodiment.

Note that in some embodiments, there may be a 1:1 mapping between configuration rules and polices—i.e., to evaluate compliance with a given policy, one and only one rule may be defined (although the rule may be applied to numerous target resources). In other embodiments, a given configuration rule may potentially be used to evaluate compliance with respect to multiple policies. Similarly, in some embodiments, there may be a 1:1 mapping between at least some rules and non-compliance remediation workflows (NRWs), while in other embodiments a given NRW may be used for multiple rules, or multiple NRWS may be employed for a given rule. Other types of policies than those indicated in FIG. 3 may be enforced at a CMS in some embodiments.

Example Exception Categories

In some embodiments in which a client of a CMS similar to CMS 110 of FIG. 1 indicates that a non-compliance remediation workflow (NRW) is generally to be executed in response to detecting non-compliance with respect to a rule or policy at a set of resources, the client may also wish to indicate exceptional scenarios in which at least some actions of the NRW should not be performed. FIG. 4 illustrates example categories of exceptions which may be associated with non-compliance remediation workflows, according to at least some embodiments. Exception descriptors indicating details of the specific exceptions that are to be used with respect to a given target resource set and a given rule may be provided via programmatic interfaces in at least some embodiments.

In one simple type of exception supported at the CMS in various embodiments, an exempt target resource list 418 may be provided by a CMS client, explicitly identifying the target resources for which an NRW (or a specific action of an NRW) is not to be implemented. Such exempted resources may, for example, include some resources for which the client wishes to ensure that any remediation tasks are performed manually, e.g., by system administrators, rather than automatically by CMS components.

In at least some embodiments, a client may associate tags (e.g., arbitrary string labels) with individual target resources—for example, one set of compute instances may be tagged as "web-servers", another as "database servers", and so on in a multi-tier application. Instead of explicitly listing exempt resources, resource-tag based exceptions 420 may be defined at client request in the depicted embodiment. For example, a client may indicate that resources tagged with the label "no-auto-reconfig" or "production" (indicating use of the target resources in a production environment) are to be exempted from one or more of an NRW's actions.

For some types of NRW actions, such as entering/submitting a problem report in a tracking database in response to a detected non-compliance, it may not necessarily be beneficial to repeat the same action repeatedly (e.g., multiple duplicated entries for the same problem may potentially be entered in a tracking database, which may later have to be identified as duplicates and discarded), even if the lack of compliance is detected multiple times, either at the same target resource or at numerous target resources. Per-target-resource action repetition exceptions 422 and/or resource group-level action repetition exceptions 424 may be used to avoid such repetitions (by limiting the number of times that a workflow or workflow action is to be performed with respect to a given resource or resource group) in the depicted embodiment. An example of a per-target-resource exception 422 may comprise the logical equivalent of the request "Do not perform action A1 of workflow NRW1 more than N1 times for a resource R1, even if NRW1 is repeatedly invoked", while an example of a resource group level exception 424 may comprise the logical equivalent if the request "Do not perform action A2 of NRW2 more than N2 times in total for resources in group RG, even if NRW2 is invoked for several of the resources". The replication exceptions 422 and 424 may also be referred to as duplication exceptions, as they may be used to avoid duplicating unnecessary operations or objects in various embodiments.

Resource ownership-based exceptions 426 may be defined to indicate that a given NRW or action should not be performed if the target resource with respect to which non-compliance was detected is assigned/allocated to or associated with a particular user, group or organizational entity. For example, the logical equivalent of "Perform actions of NRW3 on all non-compliant resources except those assigned to user UI" may be expressed as an ownership-based exception 426. In some embodiments, exception categories other than those illustrated in FIG. 4 may be supported at a CMS.

Example Constraint Categories

FIG. 5 illustrates example categories of constraints which may be enforced at a configuration service with respect to non-compliance remediation workflows, according to at least some embodiments. Cycle count constraints 518 may be defined and enforced to avoid runaway remediation workflows in some embodiments, in which the same workflow or action is repeated over and over (in cycles) because the target resource remains non-compliant with a rule or policy. In effect, a cycle count constraint 518 may indicate that an NRW or NRW action is not to be initiated or performed more than N times within a time period T. Different values for parameters N and T may be set for respective NRWs or individual NRW actions in some embodiments, in some cases based on input provided by clients. A count of times that at least a portion of the NRW has been implemented during a recent time interval may be obtained in some embodiments when deciding whether to implement the NRW again, and the new instance of the NRW may only be initiated if the cycle count constraint would not be violated by doing so. Note that for some types of exceptions and constraints, including cycle count constraints, state information pertaining to in-progress or completed NRWs or actions may be maintained at a CMS.

Time window constraints 520 may be used in some embodiments to indicate that some NRWs should only be implemented during specified hours of the day, e.g., between 2 AM and 5 AM in the local time zone of the target resource for which the NRW is being performed. Such temporal workflow execution constraints may be used to minimize the impact of the operations performed for remediation during busy periods of the applications for which the target resources are being used—e.g., if a given application is used most heavily under normal working conditions between 9 AM and 6 PM, time window constraints may be used to avoid running remediation tasks during the 9 AM-6 PM period.

In at least some embodiments, a client may wish to limit the number of NRWs or actions that are run concurrently with respect to an individual target resource, or with respect to a group of target resources. Resource group level workflow concurrency constraints 522 may be especially useful for workflows that make configuration changes at the target resources. If a client has 1000 resources that are found non-compliant with respect to a given policy at or about the same time, the client may wish to avoid making configuration changes at all the resources at the same time, e.g., in case there are some unforeseen negative consequences of the configuration changes. With respect to a group of G non-compliant resources, a constraint 522 may ensure that no more than W workflow instances (or workflow actions) are initiated or performed at the same time (or in at least partially overlapping time intervals). To enforce such a constraint, a count of target resources at which at least a portion of the NRW has been initiated may be obtained in some implementations (e.g., using a repository of status information of in-progress NRWs), and the implementation of another instance of the NRW at a different resource may be prevented if that would result in exceeding W. The thresholds may be expressed in terms of percentages instead of absolute quantities in some embodiments—e.g., the constraint may indicate that NRWs should be started for no more than P % of the non-compliant target resources at a time. Group level workflow concurrency constraints 522 may be referred to as "impact radius containment" or "blast radius containment" constraints in some embodiments.

Per-resource workflow concurrency constraints 524 may be used to avoid scenarios in which a given target resource is overloaded by the concurrent execution of numerous NRWs or NRW actions, each of which may be triggered in some cases by the non-compliance with respect to a different policy. Even if a resource is non-compliant with respect to R different rules, such a constraint 524 may ensure that no more than W NRW instances (or actions) are started up or run at the same time (or during at least partially overlapping intervals) for that resource. Constraints other than those belonging to the categories illustrated in FIG. 5 may be supported by a CMS in at least some embodiments—for example, in one embodiment, a resource consumption constraint with respect to the CMS itself may be enforced, ensuring that for a given client, no more than a specified amount of computing resources should be used for NRW execution. In some embodiments, as indicated above, CMS clients may specify the parameters of various constraints (e.g., the maximum number of NRW instances to be run concurrently with respect to a given target resource) and/or exceptions. In at least some embodiments, the CMS may use default values for some constraint or exception parameters (e.g., the maximum number of cycles in a given time interval) if the values are not provided by the CMS client.

Example Automated Actions

Figure 6:
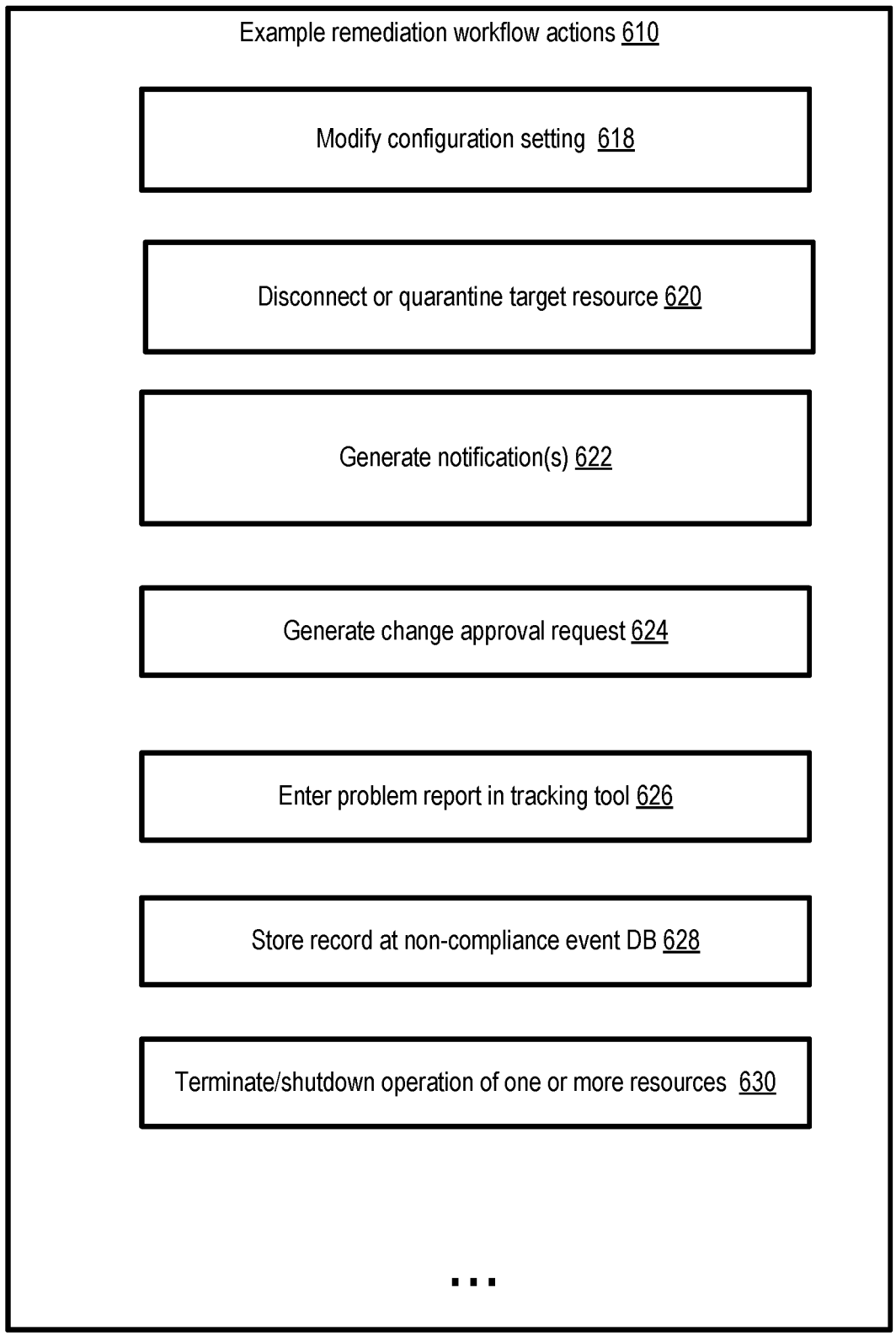
FIG. 6 illustrates example automated actions which may be performed in non-compliance remediation workflows, according to at least some embodiments.

FIG. 6 illustrates example automated actions which may be performed in non-compliance remediation workflows, according to at least some embodiments. In at least some scenarios, a given action may constitute modifying a configuration setting 618 at the target resource, or affecting the target resource. In at least some cases, after the configuration setting is successfully changed, the target resource may become compliant with respect to the policy which was being violated.

For some types of non-compliances, a target resource may be quarantined (disconnected from at least a portion of a network) as indicated by block 620 in the depicted embodiment. Such isolation from a network may, for example, enable work being performed locally at the target resource to continue, but may prevent the non-compliant resource from causing changes elsewhere in the network.

As part of some non-compliance remediation workflows (NRWs), one or more notifications may be generated, as indicated in element 622. Any of numerous types of notification mechanisms may be used in different embodiments, such as text messages, e-mails, alarms, phone calls, and the like in different embodiments.

Some actions implemented as part of an NRW may involve obtaining approvals from authorized entities for other actions of the same NRW, or for starting an instance of another NRW in the depicted embodiment. Such actions may comprise generating a change approval request 624, transmitting the approval request to one or more parties or programs, and receiving the corresponding response in at least some embodiments.

As part of some NRWs, a problem report or defect report may be entered into a defect tracking tool 626 in one embodiment, potentially resulting in a cascade of other operations such as assignment of an engineer to the problem, status update generation with respect to the reported problem, and so on. Entering such a report may serve as an official indication that a policy non-compliance has been detected and is being responded to, which may be useful information for CMS clients and system administrators. Similarly, as part of some NRW actions, a record of the non-compliance may be stored at a reporting tool or a non-compliance event database, as indicated in element 628. In at least one embodiment, an NRW action may include termination or shutdown of one or more non-compliant resources, as indicated in element 630. Other types of automated actions may be implemented as part of non-compliance remediation workflows in different embodiments. Note that in at least some embodiments, the execution of an NRW may not necessarily result in bringing a non-compliant target resource into compliance.

Example Programmatic Interactions

Figure 7:
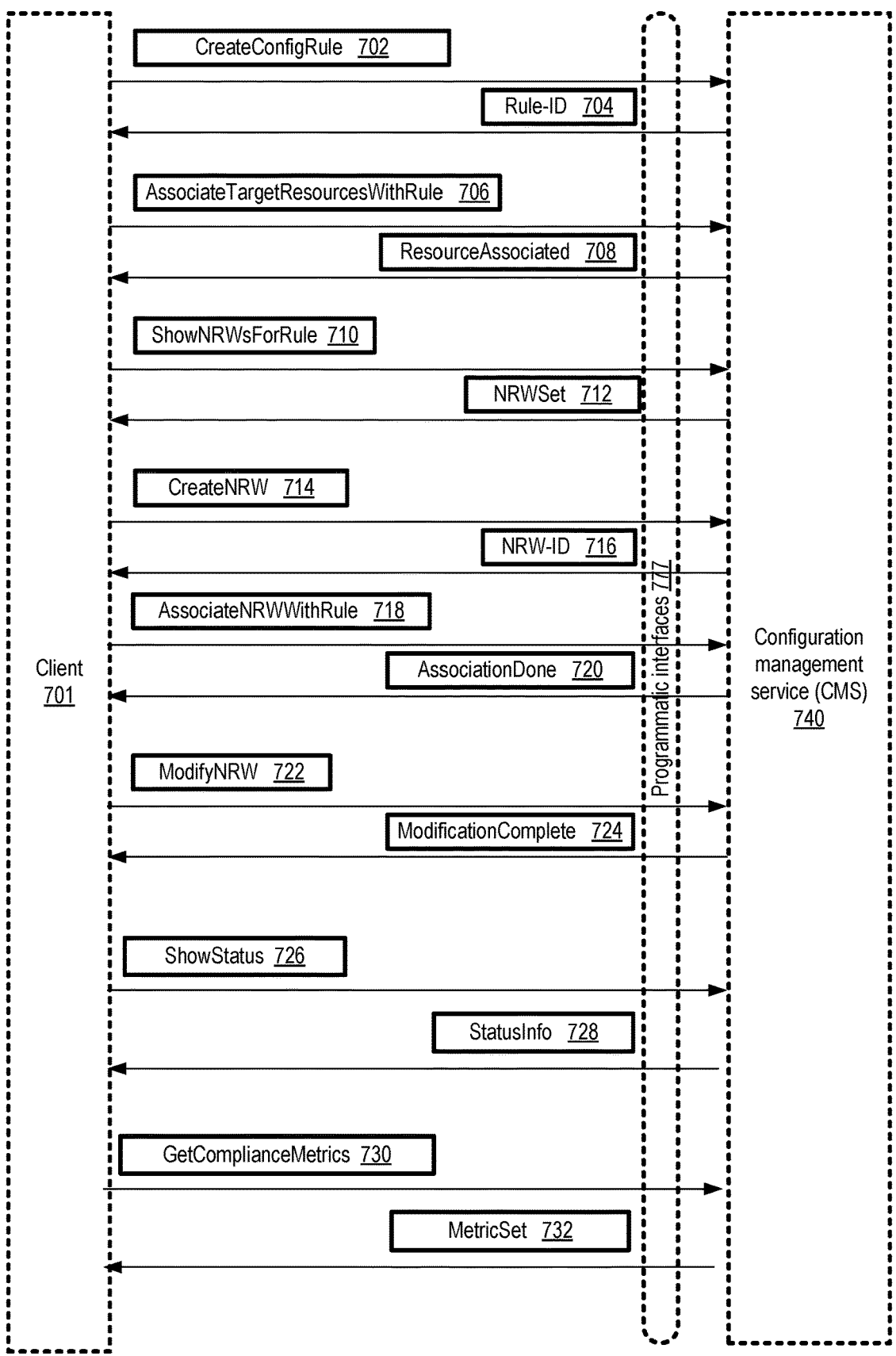
FIG. 7 illustrates example programmatic interactions associated with configuration and use of non-compliance remediation workflows, according to at least some embodiments.

FIG. 7 illustrates example programmatic interactions associated with configuration and use of non-compliance remediation workflows, according to at least some embodiments. In the depicted embodiment, a configuration management service (CMS) 740, similar in features and functionality to CMS 110 of FIG. 1, may implement a set of programmatic interfaces 777, such as APIs, command line tools, web-based consoles, graphical user interfaces and the like. Using the interfaces 777, a client 701 may submit a CreateConfigRule request 702, indicating for example one or more configuration policies, associated compliance criteria, a methodology (e.g., a command or program) to evaluate whether a target resource satisfies the criteria, and/or other properties of a configuration rule to be stored at the CMS 740. In some embodiments, the request 702 to create a configuration rule may indicate at least an initial set of target resources to which the rule is to be applied. In response to the CreateConfigRule request 702, the CMS may store one or more records representing the rule in a repository in some embodiments, generate a unique rule identifier for the newly-created rule, and transmit a Rule-ID message indicating the identifier to the client.

An AssociateTargetResourceWithRule request 706, indicating that a specified target resource or group of resources is to be associated with a specified configuration rule, may be submitted to the CMS by a client in some embodiments. In response, metadata linking the resource(s) to the rule may be stored by the CMS, and a ResourceAssociated response message 708 may be sent to the client. Note that in some embodiments, the CMS may indicate recommended pre-generated configuration rules (with individual rules indicating one or more non-compliance evaluation criteria) to a client programmatically, and a client 701 may choose to associate one of the pre-generated rules with one or more target resources. Multiple rules may be applied to a target resource or resource group in some embodiments. In some cases, both pre-generated rules and client-specified rules may be applied to a given target resource. Note that in one embodiment, rules may be specified for target resources in advance of the creation or allocation of the target resources—e.g. a client may specify that a given configuration rule is to be applied to any compute instances created in the future on behalf of the client. In some embodiments, configuration rules may be defined for specific operations rather than for resources as such—e.g. criteria to determine whether a given operation is compliant with a configuration policy, regardless of the specific resource at which the operation is performed, may be indicated in a configuration rule.

A ShowNRWsForRule request 710 may be submitted by a client 701 to obtain at least two types of information in the depicted embodiment: (a) an indication of the non-compliance remediation workflows (NRWs) which have already been associated with a given configuration rule, if any such NRWs exist, and (b) an indication of candidate (e.g., CMS-recommended) NRWs from which the client can select one or more NRWs if desired. In other embodiments, separate requests for currently-configured NRWs and for recommended pre-defined NRWs may be submitted. The CMS 740 may provide a list of zero or more NRWs in an NRWSet response 712 in the depicted embodiment.

A CreateNRW request 714 may be submitted to generate a new NRW in some embodiments, with various properties of the workflow, including the action graph, any applicable exceptions or constraints etc. being indicated via request parameters. In response, the CMS 740 may store records indicating the workflow actions and metadata in a repository, generate an identifier for the workflow, and provide the identifier in an NRW-ID message 716 to the client. In at least some embodiments, configuration rules and NRWs may both be treated as first-class objects for which respective CRUD (create, read, update and delete) APIs may be supported.

In some embodiments, the CreateNRW request may indicate one or more rules with which the workflow is to be associated. Alternatively, in at least one embodiment, an AssociateNRW request 718 may be submitted to indicate a rule with which an NRW is to be associated, and the CMS 740 may transmit an AssociationDone response message 720 after storing a record indicating that the rule and the NRW have been linked with each other.

A ModifyNRW request 722 may be used to change properties of an existing NRW, e.g., by adding/removing actions, constraints and/or exceptions in the depicted embodiment. The CMS may modify its stored representations of the affected elements of the NRW, and transmit a ModificationComplete response 724 when the changes have been made.

A client may submit one or more types of ShowStatus requests 726 in some embodiments, to obtain updated information about the completion status of NRW workflow instances, individual actions of such instances, and/or the compliance status of various target resources. In response, the requested information may be provided via one or more StatusInfo messages 728 sent by the CMS. In at least one embodiment, a dashboard or console which dynamically updates itself as new status information becomes available may be provided by the CMS.

In at least one embodiment, a client 701 may submit a GetComplianceMetrics request 730 to obtain metrics associated with configuration rules, associated NRWs and the like, and the requested metrics may be provided via one or more MetricSet messages 732. Such metrics may include, for example, a count of configuration rules in effect for a set of target resources, the number of times non-compliance with a configuration policy was detected at the target resources during some time interval, the number of NRWs instances that were executed in a time interval, the specific times at which NRW actions were initiated, the number of times that an NRW resulted in changing the status of a non-compliant resource to a compliant resource, and so on. In some embodiments, as mentioned earlier, analytics algorithms and/or machine learning models may be run using the compliance related records as input, and distribution breakdowns (e.g., geographical, client-based, or temporal) of non-compliance detections may be provided via interfaces 777, or machine learning based recommendations for reducing non-compliance may be provided to the clients via the interfaces 777. In some embodiments, NRW-related and rule-related programmatic interactions other than those shown in FIG. 7 may be supported at a CMS.

Example Provider Network Environment

Figure 8:
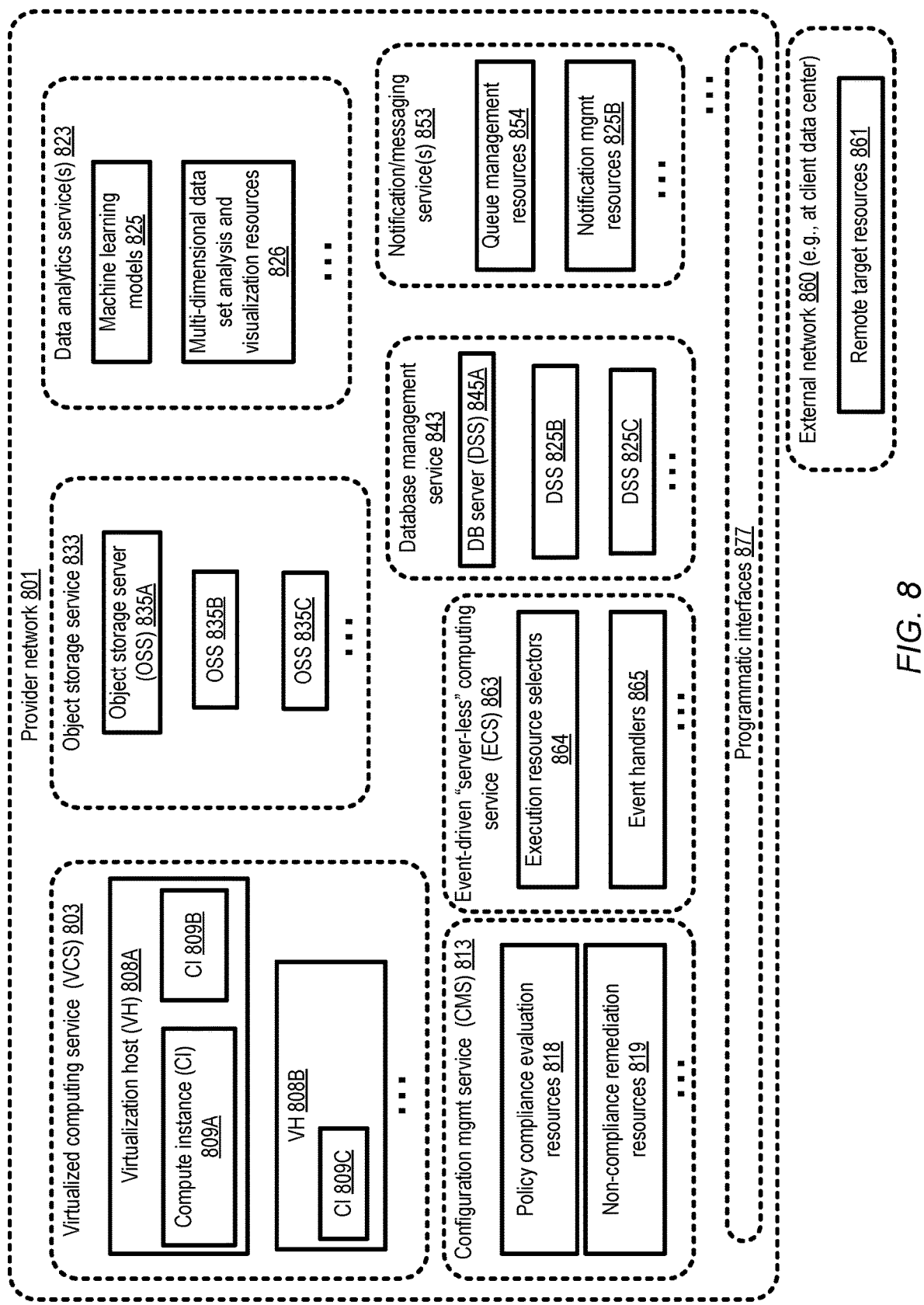
FIG. 8 illustrates an example provider network environment in which a configuration management service may be implemented, according to at least some embodiments.

FIG. 8 illustrates an example provider network environment in which a configuration management service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 801 may comprise resources used to implement a plurality of services, including for example a configuration management service (CMS) 813 (similar in features to CMS 110 of FIG. 1), a virtualized computing service (VCS) 803, an object storage service 833, a database management service 843, one or more data analytics service(s) 823, notification/ messaging services 853 and an event-drive "server-less" computing service (ECS) 863. CMS 813 may include policy compliance evaluation resources 818 (responsible for storing and evaluating configuration rules similar to those discussed earlier) and non-compliance remediation resources 819 (responsible for storing and executing non-compliance remediation workflows of the kind discussed earlier) in the depicted embodiment. The VCS 803 may comprise virtualization hosts (VHs) 808, such as 808A or 808B, at each of which some number of compute instances (CIs) 809 may be set up on behalf of VCS clients. For example, CIs 809A and 809B may be launched at VH 808A, and CI 809C may be launched at VH 808B. Database management service 843 may be used to set up highly available and reliable database instances at a collection of database servers 845, such as 845A, 845B or 845C. Object storage service 833 may provide support for arbitrarily large storage objects, with web-services interfaces being implemented for access to such objects in some embodiments; the objects themselves may be stored at some number of storage servers 835, such as 835A, 835B or 835C. Data analytics services 823 may comprise machine learning models 825 as well as multi-dimensional data set analysis and visualization resources 826. Such models 825 may be trained, for example, using execution records of NRWs and/or other data, to identify best practices usable to reduce non-compliance with respect to at least some configuration policies, and indications of such best practices may be provided to clients via CMS programmatic interfaces. Notification/messaging services may comprise, for example, queue management resources 854 (e.g., used for storing messages accessible via a publish/subscribe model) and notification management resources 855 in the depicted embodiment. Each of the services shown in FIG. 8 may include a respective set of computing devices and/or other resources such as storage devices, networking devices and the like in some embodiments.

Components of a given service may utilize components of other services in the depicted embodiment. For example, some machine learning models 825 may be trained and/or executed at compute instances 809, queue management resources 854 may utilize database servers 845 or object storage servers 825 to store messages and notification contents, and so on. Individual ones of the services shown in FIG. 8 may implement a respective set of programmatic interfaces 877 which can be used by external and/or internal clients (where the internal clients may comprise components of other services) in the depicted embodiment.

The CMS 813 may interact with other services of the provider network 801 in several ways in the depicted embodiment. First, the target resources whose configurations are managed with the help of the CMS 813 may comprise subcomponents of some of the other services— e.g., target resources associated with CMS rules and workflows may include at least some compute instances 809, database instances at the database management 843, and/or objects stored at the object storage service 833. Second, some of the operations performed by the CMS may utilize resources of other services. For example, a subset of compute instances 809 may be used to perform rule evaluations and workflow actions of the CMS in some embodiments, representations of rules, policies, workflows and associated metadata such as exceptions and constraints may be stored at object storage service 833 or database management service 843, status information pertaining to workflows and target resources may be stored at the database management service, and so on.

In at least one embodiment, to implement a particular action of an NRW, a request may be submitted to the event-driven computing service 863, indicating a program to be executed at a dynamically-selected resource. In some cases, the program to be executed to implement an NRW action may be specified as part of the NRW definition by a CMS client. In contrast to the VCS 803, where compute instances 809 may be configured and allocated to clients in advance of executed the client's applications, and VCS clients may be provided login access to the compute instances 809, computing resources may not be reserved in advance at the ECS 863 (hence the use of the term "serverless"). Instead, a functional programming model may be employed at the ECS: that is, clients of the ECS may simply have to specify the functions or programs (such as NRW actions) to be executed in their behalf, and resources for executing the programs may be selected when needed by execution resource selectors 864. The submission of the program to the ECS 863 by a client may be considered one example of an event detected and processed by event handlers 865, while the completion of the execution may be considered another example of such events. In the case of a program submission event, the event-triggered operations performed by the event handlers 865 may include passing the program on to an execution resource selector, while in the case of a program completion event, the operations performed by the event handlers 865 may include sending results of the execution to a destination indicated by the ECS client. In some embodiments, implementation of an action of an NRW by the CMS may comprise sending a request or message to a network endpoint indicated by the client when defining the NRW. In at least one embodiment, NRW-related operations performed using services similar to ECS 863 and/or using communication endpoints provided to the CMS 813 by clients may include exception evaluation and/or constraint evaluation (e.g., instead of or in addition to performing the core tasks of the action after exceptions and/or constraints have been evaluated).

NRW actions which involve notifications may be implemented using services 853 in some embodiments, and the metrics collected at the CMS may be processed at a data analytics service(s) 823. The data analytics service 823 may provide recommendations for best practices for reducing non-compliance with configuration policies, as well as detailed analysis/insights of the metrics (such as visualizations showing temporal, geographical or account-based distributions of compliance-related metrics) in at least some embodiments. In at least some embodiments, the CMS 813 may also be used to verify the compliance of remote target resources 861 (e.g., servers that are part of networks 860 external to the provider network, located at client-owned data centers, client-managed data centers, coOlocation facilities and the like).

Example Web-Based Interfaces for Non-Compliance Management

FIG. 9 illustrates an example interface which may be employed to associate a non-compliance remediation workflow with a configuration rule, according to at least some embodiments. In the depicted embodiment, a CMS similar in functionality to CMS 110 of FIG. 1 may provide a web-based interface 901 which can be used by CMS clients to enter information regarding configuration rules and associated non-compliance remediation workflows. In portion 902 of the interface 901, various details regarding configuration rules may be entered by a client. For example, a use friendly name of the rule may be entered via element 921, and a description for the rule may be entered using element 922. The client may use interface element 923 to either select from a collection of pre-defined rules (e.g., via a drop-down menu, or a search-driven text entry field), or upload a custom configuration specified using languages/scripts similar to those discussed earlier. A client may indicate the triggering conditions for evaluating a rule—e.g., whether the rule is to be evaluated periodically (e.g., every T seconds), whenever a configuration change is made at the target resource, at the time that a target resource is instantiated, and so on. Element 925 may be used to indicate target resources whose compliance or non-compliance with respect to the rule is to be detected/evaluated in the depicted embodiment.

Interface portion 903 may be used by a client to provide information about non-compliance remediation workflows to be associated with the rule in the depicted embodiment. Elements 931 and 932 may be used to provide a name and a description of the workflow, while element 933 may be used to select from a set of recommended workflows (which may have been pre-defined by the CMS), or to provide a custom workflow via an upload. As mentioned earlier, a number of different languages, scripts and the like may be used to specify custom workflows; in some embodiments, the CMS may support a special workflow description language. In one embodiment, as part of a workflow descriptor, a CMS client may provide soured code or object code versions of one or more programs to be executed to implement a workflow action. Exception descriptors for the workflow may be indicated via element 934, and constraints to be enforced with respect to the workflow may be indicated via element 935 in the depicted embodiment. Representations of the information provided by a CMS client via interface 901 may be stored at one or more CMS repositories in at least some embodiments, and used to evaluate policy compliance and respond to detected non-compliance at the target resources.

Figure 10:
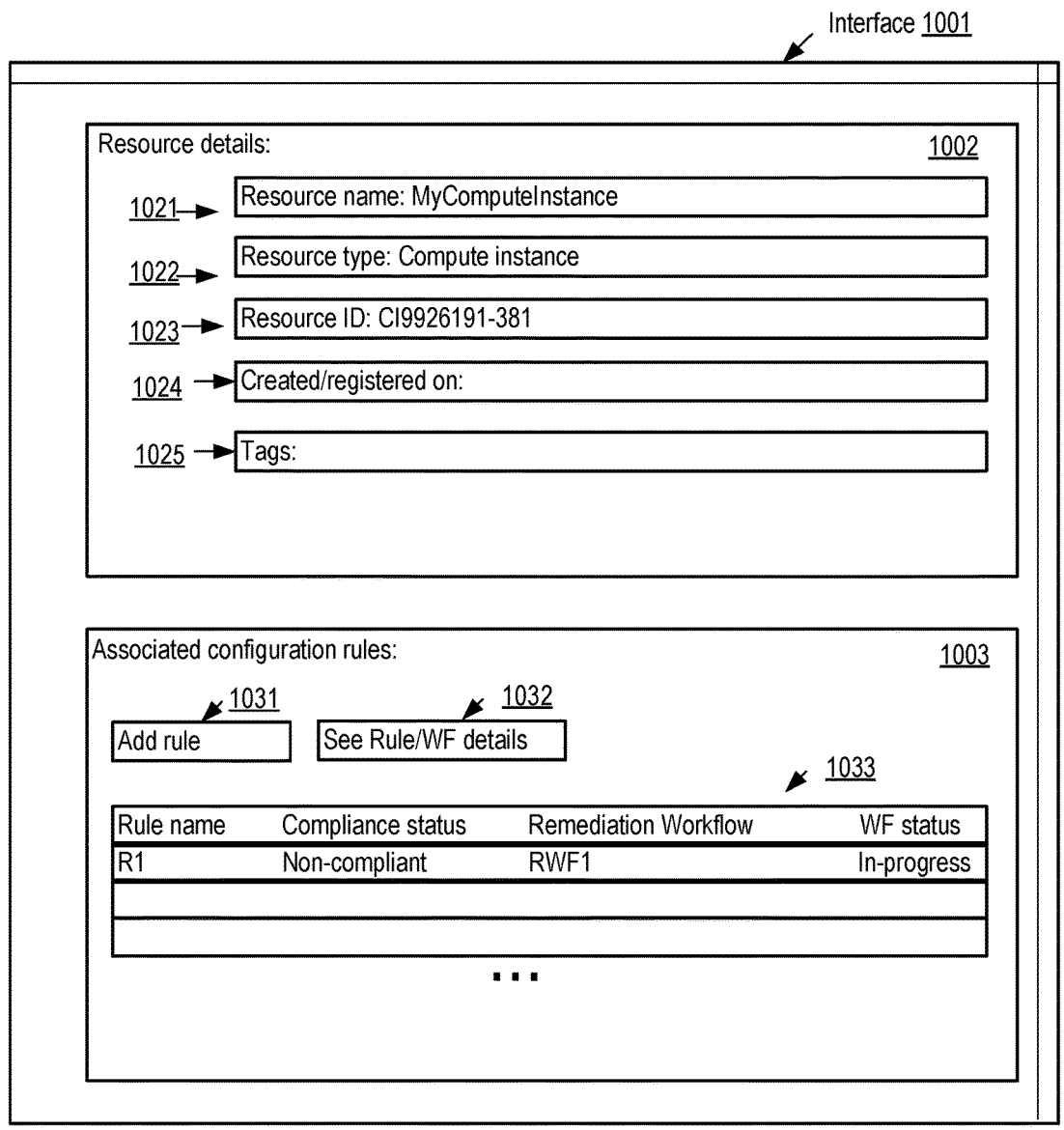
FIG. 10 illustrates an example interface which may be employed obtain status information of a non-compliance remediation workflow, according to at least some embodiments.

FIG. 10 illustrates an example interface which may be employed obtain status information of a non-compliance remediation workflow, according to at least some embodiments. At least a subset of the information illustrated in FIG. 10 may, for example, be presented in a web page in response to a click on a "show resource details" link or the logical equivalent, associated with a target resource of a configuration rule, in at least some embodiments. In portion 1002 of interface 1001, various properties of the target resource may be shown, such as a name (in element 1021), a resource type (element 1022), a resource identifier (1023), a resource instantiation/timestamp (element 1024) indicating when the resource was configured or made accessible to the CMS, and one or more tags or labels (element 1025) specified by the client for the resource. Such tags may be used for defining exceptions with respect to non-compliance remediation workflows in some embodiments, as discussed earlier in the context of FIG. 4.

In portion 1003 of interface 1001, information about the configuration rules (if any) associated with the resource whose details are shown in portion 1002 may be presented. Table 1033 may indicate the rules that have already been associated with the resource, and provide up-do-data status information regarding compliance or lack of compliance of the resource with the rules, as well as the status of corresponding non-compliance remediation workflows that may have been started. New rules may be associated with the resource using interface element 1032, while details of selected rules and/or remediation workflows may be obtained using interface element 1032 in the depicted embodiment. Note that other types of interface elements may be used to obtain and/or provide information pertaining to configuration rules, non-compliance remediation workflows, and/or target resources of the rules and workflows in some embodiments.

Example Pipeline for Non-Compliance Remediation

Figure 11:
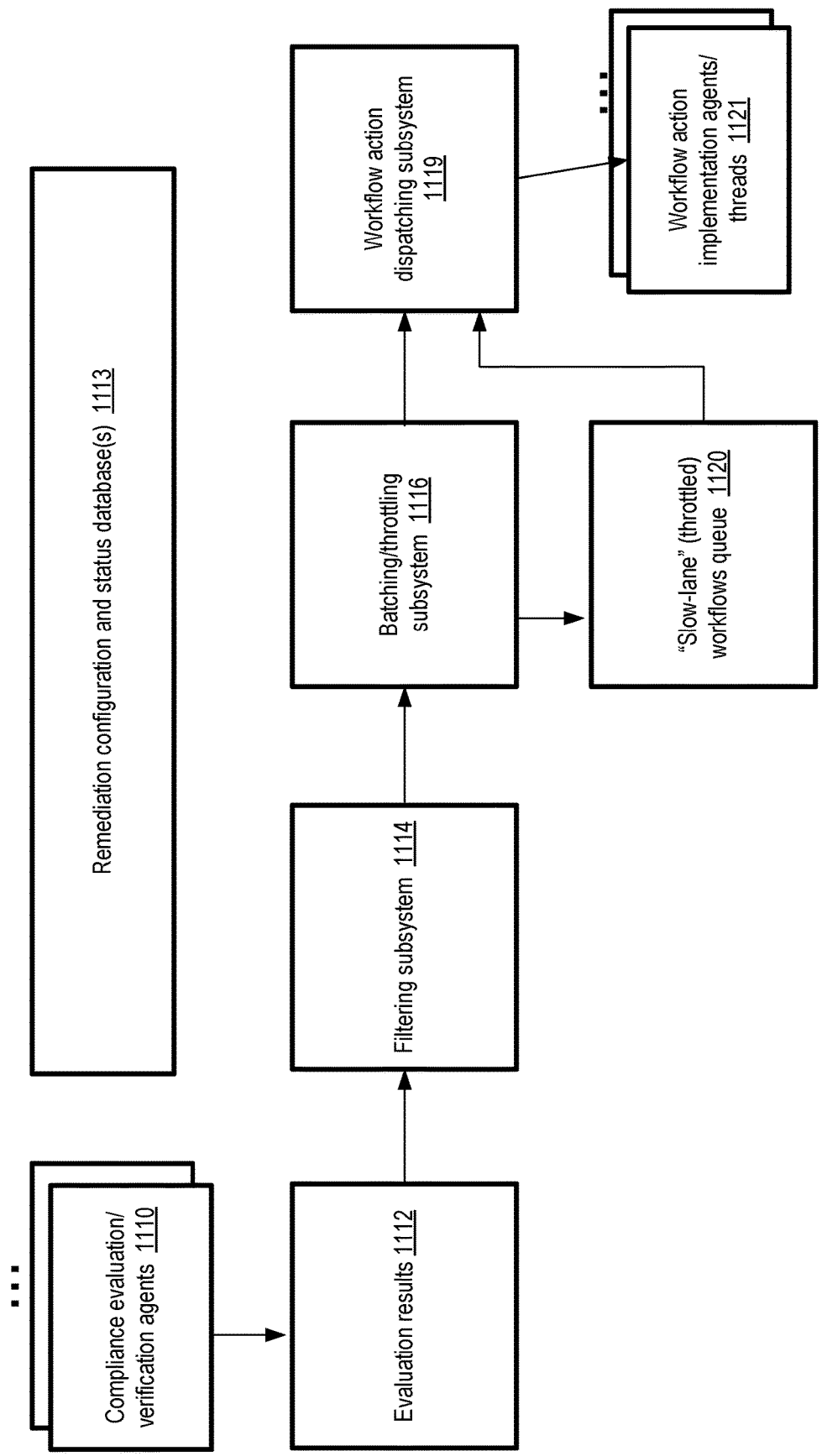
FIG. 11 illustrates examples subsystems of a pipeline used for implementing non-compliance remediation workflows, according to at least some embodiments.

In some embodiments, configuration policy compliance may have to be evaluated for hundreds of thousands, or even millions, of target resources at a configuration management service, and the number of non-compliant resources identified during a given time interval may also be very large. The computing resources, storage resources and networking resources required for monitoring compliance and performing remediation workflow actions in such scenarios may be organized into pipelines whose stages can be implemented in parallel in at least some embodiments. FIG. 11 illustrates examples subsystems of a pipeline used for implementing non-compliance remediation workflows, according to at least some embodiments. A number of policy/rule compliance evaluation/verifications agents 1110, which may for example comprise verification worker threads instantiated on one or more computing devices of the CMS, may perform the operations required to determine whether various target resources satisfy the criteria for compliance with the rules/policies associated with the target resources in the depicted embodiment. Note that depending on the type of configuration policy being enforced, in some computations and/or I/O operations may have to be performed at the target resource itself to determine whether the target resource is compliant with the policy; for other types of configuration policy, computations and/or I/O operations may also or instead be performed at other (non-target) resources, such as a networking configuration database, or a security database, to evaluate non-compliance.

The evaluation results 1112 generated by the agents 110 may be consumed as input at a filtering subsystem 1114 of the pipeline at the CMS in the depicted embodiment. In effect, for a given result indicating non-compliance of a target resource TR with a given configuration rule CR, the filtering subsystem may be responsible for the following operations: (a) determine whether the CR has a non-compliance remediation workflow NRW associated with it, (b) determining whether an in-progress instance of NRW already exists for the TR, CR combination, and (c) determining whether TR represents an exception with respect to NRW, or whether constraints of the kind indicated earlier dictate that NRW is not to be executed with respect to TR. In at least some embodiments, one or more databases or tables, such as remediation configuration and status databases 1113, may be accessed from the filtering subsystem 1114. A remediation configuration database may for example comprise key-value entries in some implementations, for which hash values obtained from rule identifiers are used as keys, and information about target resources and/or NRWs (including exceptions and constraints) is stored as part of the value. A remediation status database may comprise records which indicate, for a given NRW and target resource, whether an instance of the NRW is in progress in some embodiments. For example, in some embodiments, a record comprising an NRW identifier, an NRW action identifier, a target resource identifier, a target resource category identifier (e.g., whether the target resource is a compute instance, a storage object, or the like), and one or more timestamps indicating when the NRW action was initiated and/or completed may be stored in the status database for each NRW action that is implemented.

At the filtering subsystem 1114, using the logic indicated above, those non-compliance results for which an NRW instance is to be launched may be identified, and a corresponding message for individual ones of such results may be passed on to a batching/throttling subsystem 1116 in at least some embodiments. Depending on the kinds of automated actions that are to be performed as part of the NRWs, and the number of NRW instances that have to be scheduled for a given client, in some cases one or more of the following kinds of operations may be implemented at the batching/throttling subsystem 1116. To reduce the number of messages that have to be sent to workflow action implementation agents or threads 1121, requests for some number of yet-to-be-scheduled actions may be combined or batched into a single message in some embodiments and sent to a workflow action dispatching subsystem 1119. In addition, in some embodiments, the number of NRWs or NRW actions that can be scheduled concurrently on behalf of a given client or for a given resource or rule may be limited by the CMS, e.g., to prevent a single CMS client from consuming so many CMS resources that other CMS clients' NRWs get delayed. Note that this type of concurrency limit is different from the concurrency constraints discussed earlier, e.g., in the context of FIG. 5, in that these limits may be based on CMS resource consumption and not on the consumption of resources at the target resources, or on concerns about potential side effects of configuration changes at too many target resources. If scheduling an additional NRW instance or action would violate such a CMS-imposed limit, in at least some embodiments requests for such NRWs may be placed in a queue 1120. The queue 1120 may be referred to as a "slow-lane" or throttled workflows queue, in that the queued requests may in effect be handled at a lower priority by dispatching subsystem 1119 than requests sent directly from the batching/throttling subsystem to the dispatching subsystem 1119. In one embodiment, some requests for NRW actions may be throttled or queued because of client account-level restrictions—e.g., only a threshold number of concurrent NRW actions may be permitted on behalf of a given client account of one or more services used for implementing the action.

In some embodiments, a pool of workflow action implementation agents/threads 1121 may be set up, and individual ones of such agents/threads may initiate or perform an NRW action from a logical queue of requests for such actions, or in response to receiving a message indicating the action. Note that batching and/or throttling of the kind discussed above may not be implemented at least in one embodiment; instead, each NRW action or instance identified for execution at the filtering subsystem 1114 may be sent individually to the dispatching subsystem. In some embodiments, various components involved in implementation of the pipeline depicted in FIG. 11, such as the compliance evaluation agents 110, filtering subsystem components, batching/throttling subsystem components, dispatching subsystem components and/or workflow action implementation agents may be provided access to (and at least in some cases write permissions to) the remediation configuration and status databases 1113.

Methods for Configuration Policy Non-Compliance Remediation

Figure 12:
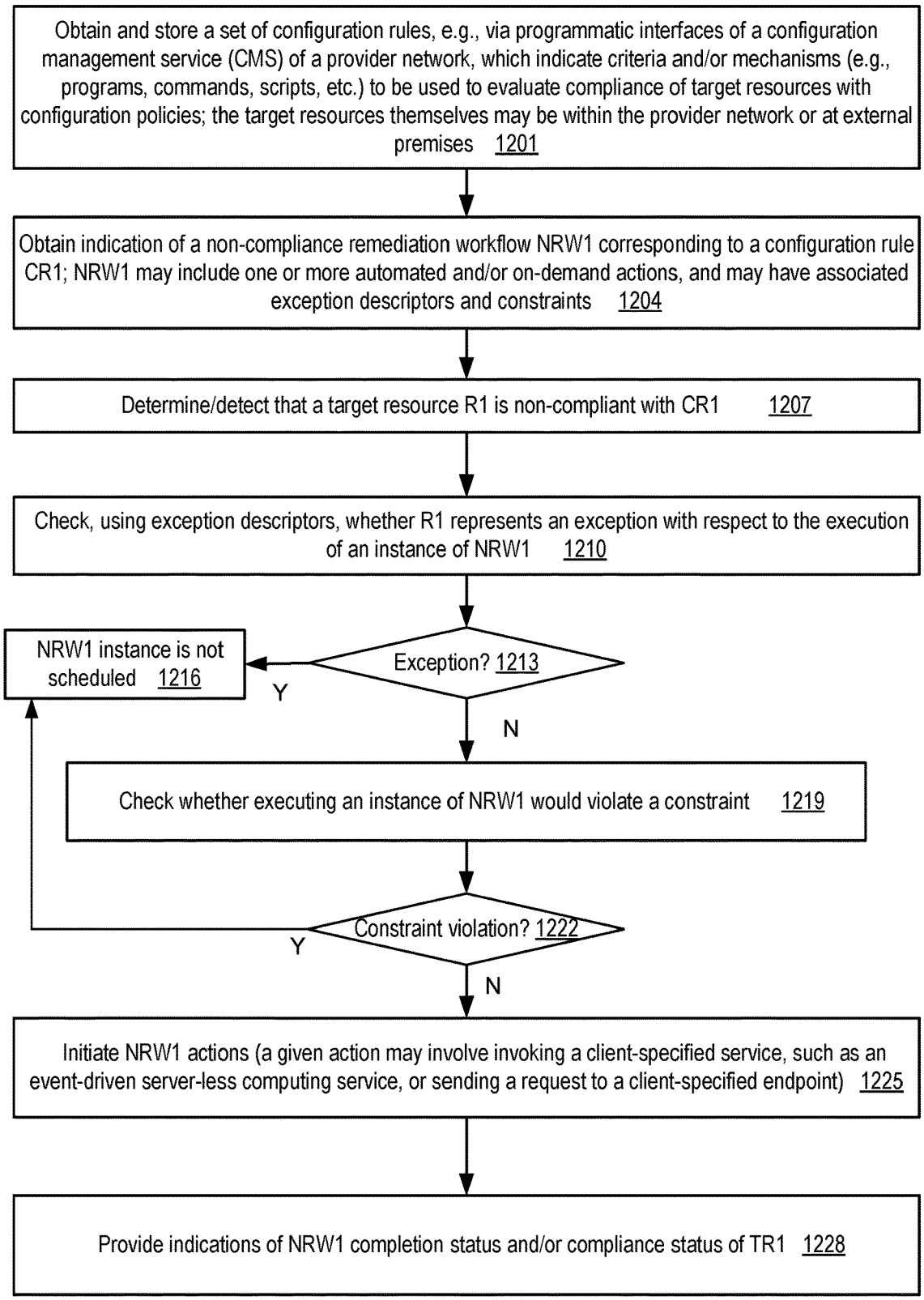
FIG. 12 is a flow diagram illustrating aspects of operations that may be performed to support non-compliance remediation workflows at a configuration management service, according to at least some embodiments.

FIG. 12 is a flow diagram illustrating aspects of operations that may be performed to support non-compliance remediation workflows at a configuration management service, according to at least some embodiments. As shown in element 1201, a set of configuration rules may be obtained, e.g., via programmatic interfaces of a configuration management service (CMS) implemented at a provider network (similar to provider network 801 of FIG. 8). Records representing the rules may be stored at a repository of the CMS in various embodiments. A given rule may indicate one or more criteria and/or mechanisms (e.g., programs, commands, scripts etc.) which can be used to evaluate or verify compliance of some set of target resources with a configuration policy (or policies) of the rule. In some embodiments, the target resources may be located entirely within data centers of the provider network at which the CMS is implemented; in other embodiments, at least some target resources may be located at premises external to the provider network. In at least one embodiment, a configuration rule may indicate that a request and/or program is to be sent to another service (such as an event-driven server-less service of the kind described earlier) to determine whether a given resource is compliant with a configuration policy or not. In another embodiment, a configuration rule may indicate that a request is to be submitted to a network endpoint (indicated in the rule definition by a CMS client) to determine whether a given resource is compliant with a configuration policy or not.

An indication of a non-compliance remediation workflow NRW1 corresponding to, or associated with, a particular configuration rule CR1 may be obtained at the CMS in various embodiments (element 1204). NRW1 may include one or more automated actions in at least some embodiments. In at least one embodiment, a given NRW may also or instead include one or more "on-demand" actions, which are to be initiated in response to a specific request from an authorized entity such as an administrator, and are not to be executed automatically by the CMS. Indications of one or more exceptions and/or constraints pertaining to NRW1, similar to the exception descriptors and constraint descriptors discussed earlier, may also be obtained in the depicted embodiment, e.g., via programmatic interfaces. Representations of NRW1's actions, exceptions, and/or constraints may be stored in a CMS repository. Note that a given NRW may not necessarily have any applicable exceptions defined in at least some embodiments. Similarly, at least in some embodiments, constraints specific to a given NRW may also not be defined. In some embodiments, the CMS may provide a list of recommended or pre-defined configuration rules (e.g., via drop-down menus of a graphical interface) that can be associated with a target given resource, and/or provide a list of recommended or pre-defined NRWs (e.g., via another drop-down menu) that may be associated with a given configuration rule, and a CMS client may select from among such candidate rules and NRWs. Such pre-configured rules and NRWs may further simplify the task of resource management from the perspective of the CMS clients. Of course, clients may define and specify their own configuration rules and/or NRWs in various embodiments, using any of a number of different markup languages, programming languages and the like as indicated earlier.

A determination may be made that a target resource R1 is non-compliant with CR1 (element 1207). The CMS may then check, using exception descriptors that were provided with respect to NRW1, whether R1 represents an exception with respect to execution of an instance of NRW1 (element 1210). If R1 represents such an exception (element 1213), no further remediation actions may be required with respect to the detected non-compliance, so no new NRW1 instance may be scheduled (element 1216).

If R1 does not represent an exception, as also detected in operations corresponding to element 1213, the CMS may check whether executing an NRW1 instance would violate an applicable constraint (element 1219) in at least some embodiments. If a determination is made that a constraint would be violated (element 1222), no further remediation actions may be required, so no new NRW1 instance may be scheduled (element 1216).

If no constraint would be violated, one or more of NRW1's actions may be initiated in the depicted embodiment (element 1225). As mentioned earlier, in at least some embodiments, services other than the CMS (such as a server-less computing service) or network endpoints indicated by a client may be used for one or more tasks associated with NRW1—e.g., a request may be sent to such a service or endpoint to check whether execution of an action of NRW1 represents an exception, to check whether any constraints would be violated by the execution of an action, and/or to perform the action itself. Indications of NRW1's completion status (e.g., at the per-action level, or at the level of the workflow as a whole) may be provided via programmatic interfaces in at least some embodiments (element 1228). For example, in some embodiments an indication may be provided as to whether an action or NRW1 as a whole is "in-progress" or "completed". In addition, in at least some embodiments, an indication of the compliance status of TR1 with respect to CR1 (i.e., whether TR1 is now in compliance, or remains non-compliant) may be provided programmatically in at least some embodiments.

It is noted that in various embodiments, some of the operations shown in FIG. FIG. 12 may be implemented in a different order than that shown in the figure (e.g., constraints may be checked before exceptions), or may be performed in parallel rather than sequentially. Additionally, some of the operations shown in FIG. 12 may not be required in one or more implementations.

Use Cases

The techniques described above, of enabling the configuration and implementation of configuration policy non-compliance remediation workflows, may be extremely beneficial in a variety of scenarios. Many modern large-scale applications are run using compute instances at virtualized computing services of provider networks, and often utilize storage services and other services of the provider networks as well. Often, some of the provider network's resources may be used in a multi-tenant mode. A number of configuration policies, e.g., security-related and other types of policies defined by IT (Information Technology) departments and in some cases based on legal requirements, may have to be enforced with respect to the resources used on behalf of some provider network clients. Especially in cases when a given provider network client utilizes large numbers (e.g., tens of thousands) of resources, verifying that each resource complies with all the applicable policies may be a time-consuming and error-prone process in itself. Remediating instances of non-compliance that are detected may be even more of a challenge. By allowing clients of a configuration management service to define and associate configuration rules with their resources, as well as workflows to be implemented automatically in the event a non-compliance with respect to configuration policies is detected, the security, availability and reliability of various applications may be greatly enhanced. In addition, substantial flexibility and customization with respect to configuration policies may be supported by allowing clients to specify exceptions and constraints with respect to remediation workflows. Insight into potential areas for improvement with respect to reducing policy non-compliance may also be provided, e.g., using machine learning and visualization tools.

Illustrative Computer System

Figure 13:
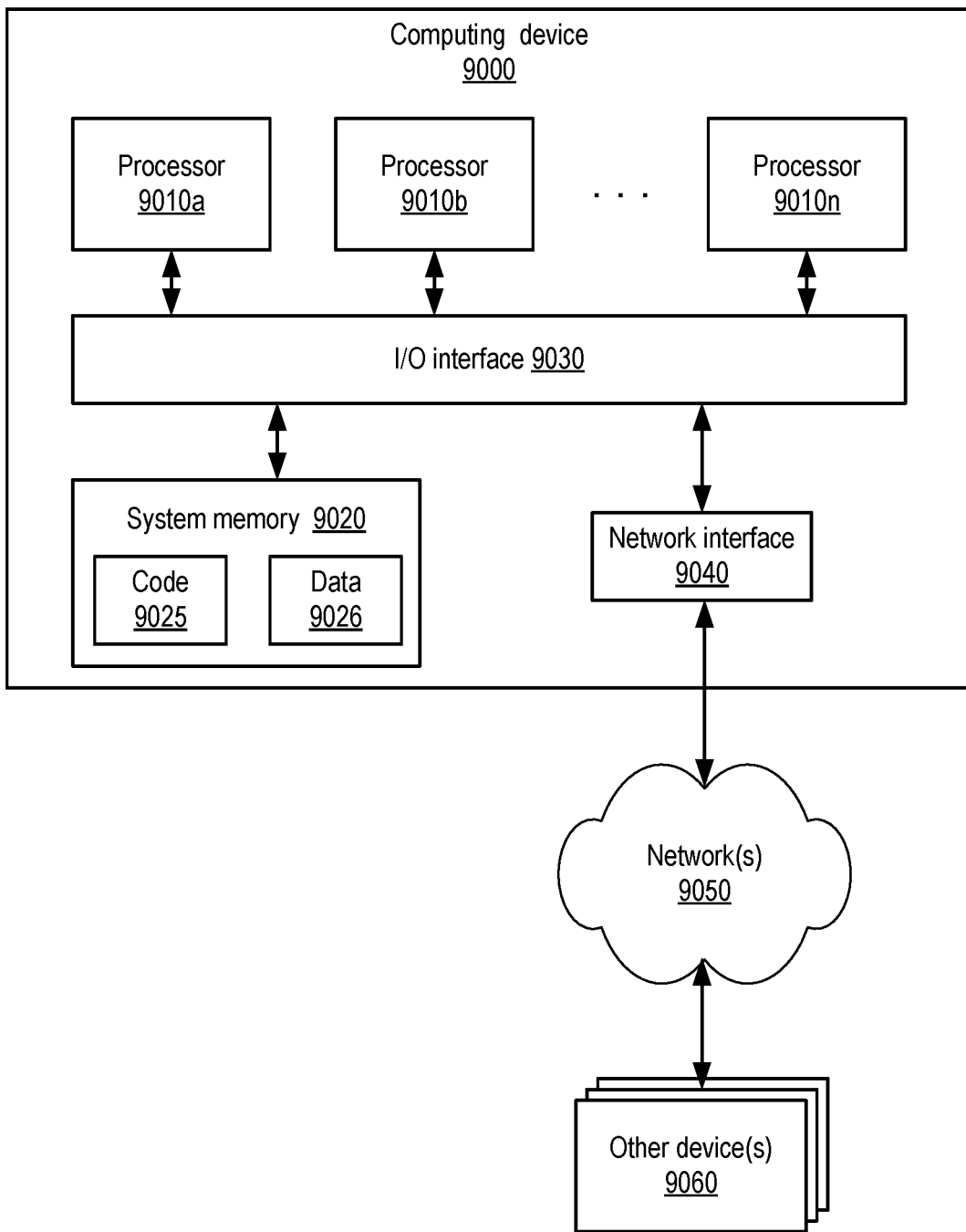
FIG. 13 is a block diagram illustrating an example computing device that may be used in at least some embodiments.

In at least some embodiments, a server that implements a portion or all of one or more of the technologies described herein, including the techniques for various components of a configuration management service implementing non-compliance remediation workflows, may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across one or more processors cause the one or more computing devices to:
store a configuration rule indicating one or more criteria to evaluate compliance of one or more target resources of a provider network with a configuration policy;
obtain respective indications, via one or more programmatic interfaces, of (a) a non-compliance remediation workflow corresponding to the configuration rule, comprising at least a first automated action, (b) one or more exception descriptors of the non-compliance remediation workflow and (c) one or more constraints associated with performing the first automated action, including a cycle count constraint;
in response to (a) a detection that a particular target resource of the one or more target resources does not satisfy at least one criterion of the one or more criteria, (b) a determination that implementation of the first automated action with respect to the particular target resource does not represent an example of an exception indicated in the one or more exception descriptors, and (c) an analysis indicating that implementation of the first automated action with respect to the particular target resource does not violate the one or more constraints,
initiate implementation of at least the first automated action of the non-compliance remediation workflow; and
provide one or more indications of (a) a completion status of the non-compliance remediation workflow and (b) a compliance status of the particular resource with respect to the configuration rule; and
in response to (a) detection that another one of the one or more target resources does not satisfy at least one criterion of the one or more criteria, and (b) a determination that implementation of the first automated action with respect to the other one of the target resources does represent an example of an exception indicated in the one or more exception descriptors, not initiate implementation of at least the first automated action of the non-compliance remediation workflow despite the detection that the other one of the one or more target resources does not satisfy at least one criterion of the one or more criteria.

2. The system as recited in claim 1, wherein the implementation of the first automated action of the non-compliance remediation workflow comprises one or more of: (a) a transmission of a request to a computing service specified via the one or more programmatic interfaces or (b) a transmission of a request to a communication endpoint specified via the one or more programmatic interfaces.

3. The system as recited in claim 1, wherein the configuration policy comprises one or more of: (a) a security policy, (b) a cost control policy, (c) a connectivity policy, (d) an availability policy, (e) a data durability policy, (f) a resource category restriction policy, (g) a performance optimization policy, (h) a tenancy policy, (i) a record-keeping policy, (j) a regulations-based policy of a particular jurisdiction, or (k) a privacy protection policy.

4. The system as recited in claim 1, wherein a first exception descriptor of the one or more exception descriptors indicates one or more of: (a) a limit on the number of times that a particular action of the non-compliance remediation workflow may be performed with respect to a particular target resource, (b) a limit on the number of times that a particular action of the non-compliance remediation workflow may be performed with respect to a group of target resources, (c) an identifier of an entity or group, such that at least one action of the non-compliance remediation workflow is not to be performed with respect to a target resource of the entity or group, or (d) one or more exempt target resources, such that at least one action of the non-compliance remediation workflow is not to be performed with respect to the one or more exempt target resources.

5. The system as recited in claim 1, wherein the first automated action comprises one or more of: (a) terminating operation of the particular target resource, (b) causing a change to a configuration setting of the particular target resource, (c) disconnecting the particular target resource from at least a portion of a network, (d) generating one or more notifications, (e) initiating a request for approval of a configuration change, (f) causing a defect to be entered at a defect tracking tool, or (g) causing a record to be stored in a reporting tool.

6. A method, comprising:
performing, at one or more computing devices:
determining a configuration policy applicable to one or more target resources;
obtaining respective indications, via one or more programmatic interfaces, of (a) a non-compliance remediation workflow corresponding to the configuration policy, wherein the non-compliance remediation workflow comprises at least a first action and (b) one or more exception descriptors associated with the non-compliance remediation workflow;
in response to at least (a) detecting that a particular target resource of the one or more target resources does not comply with the configuration policy, and (b) determining that implementation of the first action with respect to the particular target resource does not represent an example of an exception indicated in the one or more exception descriptors,
initiating implementation of at least the first action of the non-compliance remediation workflow; and
providing an indication of a compliance status of the particular resource with respect to the configuration policy; and
in response to (a) detecting that another one of the one or more target resources does not comply with the configuration policy, and (b) determining that implementation of the first action with respect to the other target resource does represent an example of an exception indicated in the one or more exception descriptors, not initiating implementation of the first automated action of the non-compliance remediation workflow despite the detecting that the other one of the one or more target resources does not comply with the configuration policy.

7. The method as recited in claim 6, wherein the configuration policy comprises one or more of: (a) a security policy, (b) a cost control policy, (c) a connectivity policy, (d) an availability policy, (e) a data durability policy, (f) a resource category restriction policy, (g) a performance optimization policy, (h) a tenancy policy, (i) a record-keeping policy, (j) a regulations-based policy of a particular jurisdiction, or (k) a privacy protection policy.

8. The method as recited in claim 6, wherein the one or more programmatic interfaces are implemented at a configuration management service of a provider network, and wherein particular target resource comprises one or more of: (a) a compute instance of a virtualized computing service of the provider network, (b) a storage instance of a storage service of the provider network, or (c) a resource at a premise external to the provider network.

9. The method as recited in claim 6, wherein a first exception descriptor of the one or more exception descriptors indicates one or more of: (a) a limit on the number of times that a particular action of the non-compliance remediation workflow may be performed with respect to a particular target resource, (b) a limit on the number of times that a particular action of the non-compliance remediation workflow may be performed with respect to a group of target resources, (c) an identifier of an entity or group, such that at least one action of the non-compliance remediation workflow is not to be performed with respect to a target resource of the entity or group, or (d) one or more exempt target resources, such that at least one action of the non-compliance remediation workflow is not to be performed with respect to the one or more exempt target resources.

10. The method as recited in claim 6, further comprising performing, at the one or more computing devices:
obtaining a count of times that at least a portion of the non-compliance remediation workflow has been implemented during a time interval, wherein initiating the implementation of at least the first action is responsive at least in part to determining, using the count of times, that implementing an additional instance of the non-compliance remediation workflow does not violate a cycle count constraint.

11. The method as recited in claim 6, further comprising performing, at the one or more computing devices:
obtaining a count of target resources at which at least a portion of the non-compliance remediation workflow has been initiated, wherein initiating the implementation of at least the first action is responsive at least in part to determining, using the count of target resources, that implementing an additional instance of the non-compliance remediation workflow does not violate a workflow concurrency constraint.

12. The method as recited in claim 6, further comprising performing, at the one or more computing devices:
obtaining a count of other remedial non-compliance remediation workflows that have been initiated with respect to the particular target resource, wherein initiating the implementation of at least the first action is responsive at least in part to determining, using the count of other remedial non-compliance remediation workflows, that implementing an additional instance of the non-compliance remediation workflow does not violate a workflow concurrency constraint.

13. The method as recited in claim 6, wherein initiating the implementation of at least the first action is responsive at least in part to determining that implementing an additional instance of the non-compliance remediation workflow does not violate a temporal workflow execution constraint.

14. The method as recited in claim 6, further comprising performing, at the one or more computing devices:
causing to be provided, via the one or more programmatic interfaces, one or more of: (a) a recommended configuration policy, (b) a recommended criterion for determining whether a resource is compliant with a configuration policy, or (c) a recommended non-compliance remediation workflow.

15. The method as recited in claim 6, further comprising performing, at the one or more computing devices:
causing to be provided, via the one or more programmatic interfaces, an indication of a permission required for a non-compliance remediation workflow.

16. One or more non-transitory computer-accessible storage media storing program instructions that when executed on or across one or more processors cause one or more computer systems to:
identify a configuration policy applicable to one or more target resources;
obtain an indication, via one or more programmatic interfaces, of (a) a non-compliance remediation workflow corresponding to the configuration policy, wherein the non-compliance remediation workflow comprises at least a first action and (b) one or more exception descriptors associated with the non-compliance remediation workflow;
in response to at least (a) detecting that a particular target resource of the one or more target resources does not comply with the configuration policy, and (b) determining that implementation of the first action with respect to the particular target resource does not represent an example of an exception indicated in the one or more exception descriptors,
initiate implementation of at least the first action of the non-compliance remediation workflow; and
in response to (a) detection that another one of the one or more target resources does not comply with the configuration policy, and (b) determine that implementation of the first action with respect to the other target resource does represent an example of an exception indicated in the one or more exception descriptors, not initiate implementation of the first automated action of the non-compliance remediation workflow despite the detection that the other one of the one or more target resources does not comply with the configuration policy.

17. The one or more non-transitory computer-accessible storage media as recited in claim 16, storing further program instructions that when executed on or across the one or more processors further cause one or more computer systems to:
train a machine learning model using records of executions of one or more non-compliance remediation workflows;
identify, using results of the machine learning model, one or more best practices usable to reduce non-compliance with respect to a set of configuration policies; and
provide an indication of the one or more best practices.

18. The one or more non-transitory computer-accessible storage media as recited in claim 16, wherein the configuration policy comprises one or more of: (a) a security policy, (b) a cost control policy, (c) a connectivity policy, (d) an availability policy, (e) a data durability policy, (f) a resource category restriction policy, (g) a performance optimization policy, (h) a tenancy policy, (i) a record-keeping policy, (j) a regulations-based policy of a particular jurisdiction, or (k) a privacy protection policy.

19. The one or more non-transitory computer-accessible storage media as recited in claim 16, storing further program instructions that when executed on or across the one or more processors further cause one or more computer systems to:

verify, prior to initiating the implementation of the first action, that performing the first action at the particular target resource does not represent an example of an exception indicated in one or more exception descriptors associated with the non-compliance remediation workflow.

20. The one or more non-transitory computer-accessible storage media as recited in claim 16, storing further program instructions that when executed on or across the one or more processors further cause one or more computer systems to:

provide, via another programmatic interface, results of a temporal, geographical or account-based distribution analysis of one or more non-compliance remediation workflows.

* * * * *